United States Patent

[11] 3,612,976

[72] Inventor Robert W. Tripp
Tuckahoe, N.Y.
[21] Appl. No. 814,670
[22] Filed Apr. 9, 1969
[45] Patented Oct. 12, 1971
[73] Assignee Inductosyn Corporation
Carson City, Nev.
Continuation-in-part of application Ser. No. 729,018, May 14, 1968, now abandoned.

[54] POSITION CONTROL SYSTEM
14 Claims, 18 Drawing Figs.

[52] U.S. Cl. ............................................. 318/603,
235/151.11, 235/92 MP
[51] Int. Cl. ............................................. G05b 19/18
[50] Field of Search ............................................. 235/92
(28), 151.11; 318/20.320

[56] References Cited
UNITED STATES PATENTS
3,209,222  9/1965  Holy .......................... 318/28
3,223,830  12/1965  Evans ......................... 235/92
3,473,098  10/1969  Waller ........................ 318/162
3,473,100  10/1969  Anger ......................... 318/28

Primary Examiner—Eugene G. Botz
Attorney—William E. Beatty

ABSTRACT: A control system for positioning a machine member from an initial position to a new command position. The member is moved by appropriate motor and control means in cooperation with a delta counter the contents of which continuously represent distance remaining to travel.

Initially, data representing the command position are read into temporary storage and compared with data, representing the initial position of the machine member, contained in another (external) counter. A series of pulses, herein designated ΔRCT, increment or decrement the other counter, depending on whether the data in temporary storage is greater than or less than the data in the other counter. Simultaneously, the ΔRCT pulses increment the delta counter away from zero. When the contents of the other counter and temporary storage become equal, generation of the ΔRCT pulses is inhibited; the delta counter then contains how far the machine member must travel to get to the command position.

As the machine member moves toward the command position, a second series of pulses (herein designated RCT), each representing motion through an incremental distance, decrement the delta counter toward zero. As the delta counter contents decrease, indicating less distance to go, appropriate speed control signals are provided to slow down the motor. When the delta counter decrements to a predetermined value corresponding to a selected distance from the command position, the motor may be deenergized and the machine member coasts to a halt. Alternatively, when the delta counter reaches the predetermined value, a servosystem may be actuated which drives the member to the command position.

Should the member stop at other than the command position, the residual contents of the delta counter will represent the positioning error. The delta counter then is decremented to zero, and the contents of the other counter thereby correspondingly altered so as to represent the actual stop position. Additionally, the system includes storage of zero offset data. This feature has the advantage of resuming operation after an interruption, automatically, without extensive setting up operation or computation.

INVENTOR
ROBERT W. TRIPP
BY W.E.Beatty
ATTORNEY

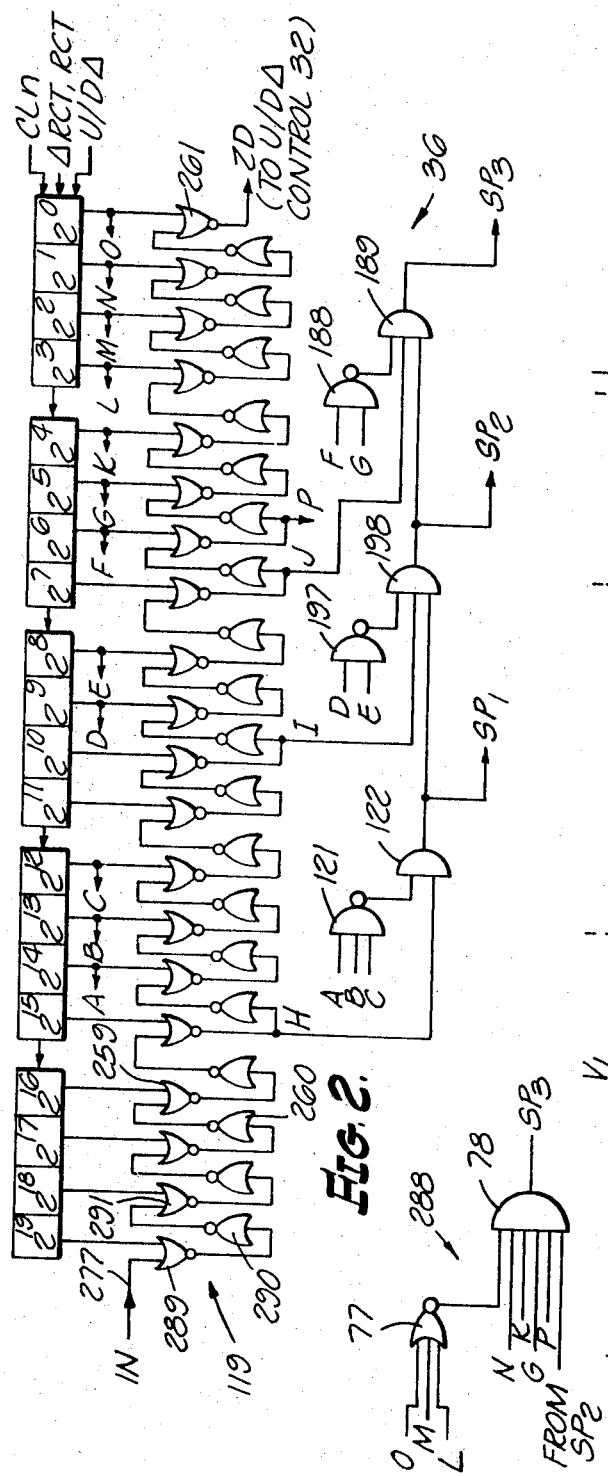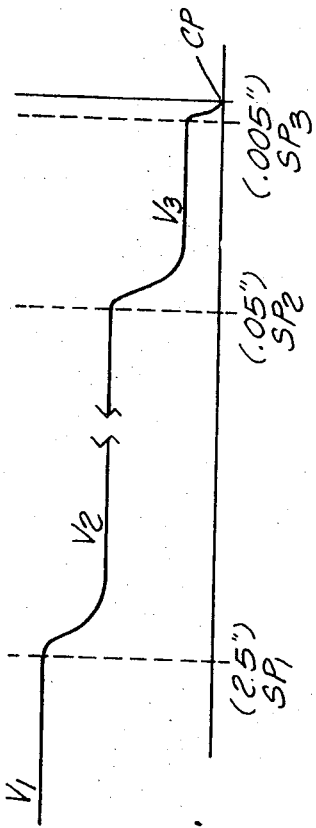
Fig. 2.
Fig. 16.
Fig. 3.
INVENTOR
ROBERT W. TRIPP
BY
ATTORNEY

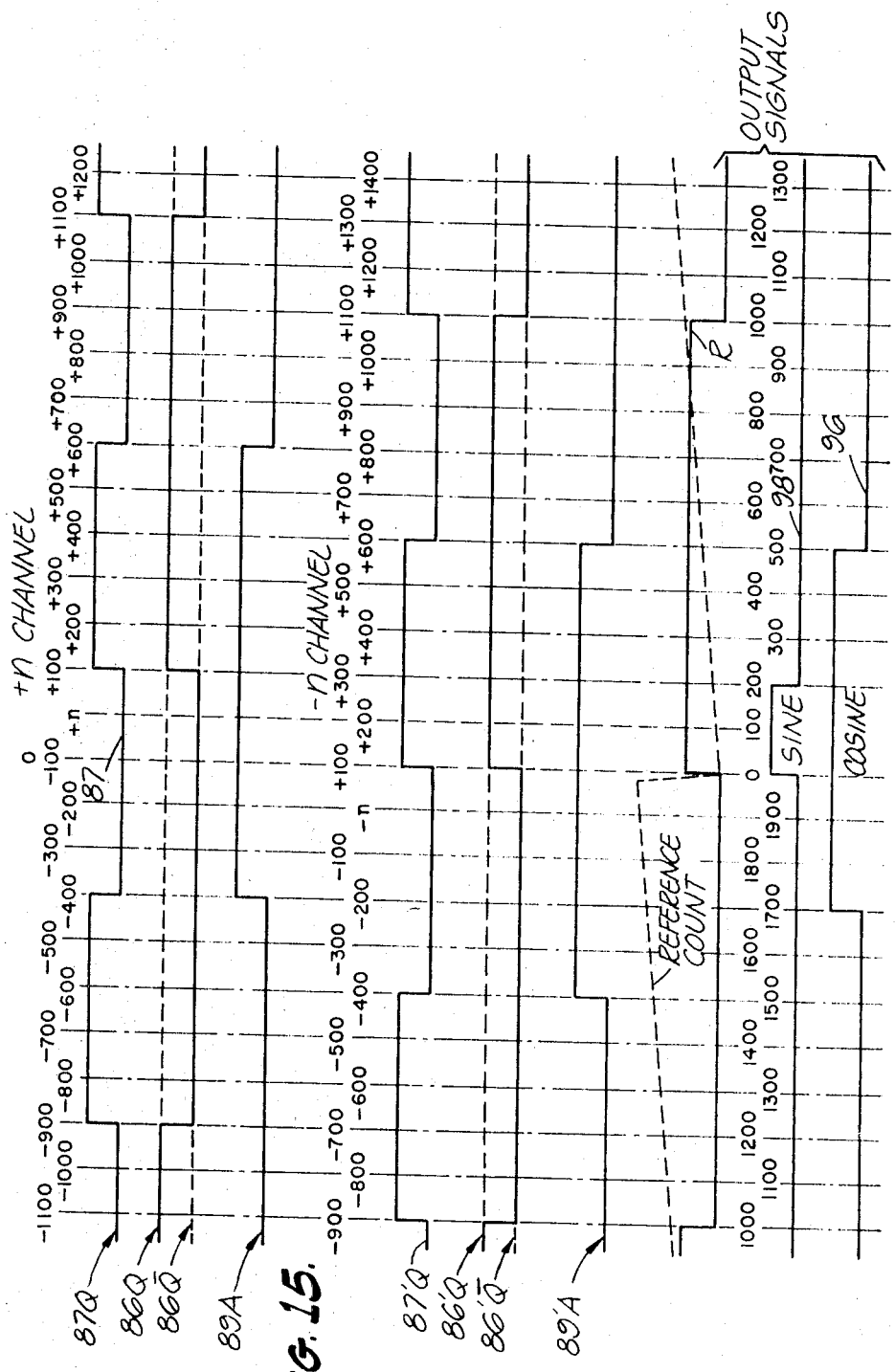

POSITION CONTROL SYSTEM

RELATED APPLICATIONS

The present application is a continuation-in-part of the inventor's copending U.S. application Ser. No. 729,018, filed May 14, 1968, now abandoned, entitled POSITION CONTROL SYSTEM. The function generator incorporated hereinbelow is set forth in the inventor's copending U.S. application Ser. No. 645,161, filed June 12, 1967, entitled DIGITAL-TO-ANALOG CONVERTER, now Pat. No. 3,514,775. The position readout apparatus incorporated hereinbelow is set forth in the inventor's copending U.S. applications, Ser. No. 739,579 filed May 14, 1968, now abandoned, and Ser. No. 809,533, filed Mar. 24, 1969 both entitled POSITION MEASURING SYSTEM.

BACKGROUND OF THE INVENTION

1. Field of the Invention

This invention relates to a position control system and, more particularly, to such a system using an incremental counter in controlling the position of a movable machine member.

2. Description of Prior Art

Positioning systems have been constructed of the so-called "slowdown and stop" type where one or more signals are given in anticipation of the final positioning point to decrease the feed rate appropriately so that the movable member will stop and position most precisely. Other systems have been constructed employing a servo drive which servos the movable member to the final positioning point. Generally, in either case the final positioning occurs within a cycle of the position-measuring device used by the system.

A position-measuring device usable by certain systems is described in U.S. Pat. No. 2,799,835 for Position Measuring Transformer by R. W. Tripp et al., issued July 16, 1957, and sold under the trademark INDUCTOSYN, registered in the U.S. Patent Office.

The "Inductosyn" device, whether in a linear or rotary form, senses the movement of a machine based on the inductive coupling between conductors of the primary and secondary windings separated by a small air space. The displacement of the primary and secondary windings is represented in electrical degrees. The spacing of three consecutive conductors of the secondary winding corresponds to a cycle of 360 electrical degrees which is equivalent, for example, to 0.2 inches. The 0.2 inches would be equal to a cycle of the measuring device.

The unique manner of operation enables a very high accuracy in the measurement and control of linear or rotary displacement. The usual coupling and counting problems associated with conventional encoders and optical scales are eliminated.

The present invention relates to a system for measuring and controlling the position of a machine having fixed and movable members wherein the relative position of the members is measured and/or controlled by equipment including a position-measuring transformer which has a cycle of small dimension in comparison to the total distance to be measured or the distance throughout which the position is to be controlled.

It is therefore necessary that a precise measurement be made within the cycle of the position-measuring transformer and also that the measurement include the larger dimension external to one cycle which may be many cycles of the position-measuring device.

A further difficulty is that the starting point of measurement on the part to be measured may not coincide with the fiducial point of the measuring device. The present invention eliminates these difficulties in a novel and simple manner and provides a unique and simple method to establish once and for all this difference on any one setup of a part to be measured. This difference is computed and stored in the measuring and controlling system. Heretofore this reconciliation was made by computing the difference between the programmed position point and the starting point of the cycle of the position-measuring device adjacent to the same point. When a successive measurement is programmed in the same setup a new different dimension is encountered.

The difficulty is avoided in the present invention. In order to correlate the portion of the dimension outside of the measuring cycle, it is necessary to know the relationship between the starting point of the measurement on the part and the fiducial point of the measuring system.

By the present invention only one difference dimension is determined for each setup and used for all successive programmed positions.

At the time of setup, the dimensional difference between the starting point on the part and the fiducial point of the measuring device is computed and memorized in the system. Thereafter, as measurement are made of successive programmed positions, it is not necessary to recompute a difference dimension for each measurement.

The computation and storage of the dimensional difference between the starting point on the part and the fiducial point of the measuring device is described and claimed in the referenced application for a Position Measuring System filed May 14, 1968, Ser. No. 739,579, now abandoned, by R. W. Tripp. That application also sets forth and claims apparatus for measuring and reading out other positions on the part, the measurements automatically being referenced to the starting point on the part.

In the program control systems using the slowdown or the servo method, it may be necessary to have signals anticipating the program position to cause the feed rates to change or to cause the servo to function. This involves computations of position for each program point of which there may be many.

By the present invention, a "how-far-to-go" counter is provided. This is a counter which always counts down to the program position. Heretofore, this difficulty has been overcome in part by providing sequential programming where the operator is required to program each succeeding program position from the preceding program position.

By the present invention, sequential programming is not required, that is, positions may be programmed with respect to a zero reference position.

In analog systems, analog offsets have been employed providing anticipatory position signals which are removed as the machine proceeds from one slowdown position to another or the final position.

The present invention, being digital in nature, accomplishes the result by indicating at certain counts of the "how-far-to-go" counter where these functions are to be performed. These functions are performed for each programmed position without disturbing the counter.

One type of digital system for controlling the position of a machine member is described in U.S. Pat. No. 3,117,263 for Automatic Position Control Devices, Jan. 7, 1964, by A. T. MacDonald. In that system, a movable member is initially driven in response to the difference between a coarse positioning command and the actual position of the member until coarse and actual position are equal. Subsequently, the member is driven in response to the difference between a fine positioning command and the actual position of the member until the fine command and actual position are equal.

The system uses a position measuring transformer of the type described above having a plurality of sequential operating cycles. The coarse command represents a position equal to an integral number of said cycles whereas the fine command represents a position within the cycle following the last cycle of the coarse command position.

BRIEF DESCRIPTION OF INVENTION

Briefly, the invention comprises a system for positioning a movable machine member. The system includes means for comparing digital data representing a present command position with digital data representing a prior command position or with a zero command position if a prior command has not been executed.

If an inequality is determined, the prior command position in changed until the commands are equal. Simultaneously, an incremental counter is changed an amount equal to the difference. The incremental counter controls the drive velocity of the movable member.

In one mode of operation, the drive velocity is reduced at preselected counts until the stop point is detected, at which time the member is permitted to coast to the commanded position. Selection of the counts for reduction of the drive signal is a function of the machine characteristics. In different machines, the complete removal of the drive signal, or selected stop point, may occur at different counts.

The counter is not automatically cleared after the slowdown and stop mode. It may pass through zero and count in the opposite direction if the member "coasts", or is driven, past the commanded position. As a result, a new difference command is algebraically summed with the residual count in the counter and cumulative errors are eliminated.

In another mode of operation, the incremental counter is rapidly counted to zero at a preselected position as determined by the count in the counter. The count resulting, as the incremental counter is reduced to zero, is stored in an internal counter and used as a fixed command signal during the servo mode. The system operates in response to the fixed command signal as a closed loop servosystem and the movable member is driven the remaining distance to the command position.

If the member is driven past the commanded position and the error signal increases above a certain magnitude, the movable member is driven in the opposite direction until the preselected point is detected from the opposite direction and the servo mode is again entered. The final positioning can be made from either direction.

When the servo mode is entered, the characteristics of the drive means are alterable to optimize positioning control near the command position.

Display means are provided for indicating the least significant digits of the position represented by the count in the incremental counter. Inputs to the display can also be used for providing BCD signals directly to other systems such as a computer for automatically correcting a positioning error. The system also includes means for generating a linear control signal proportional to the count in the incremental counter.

The individual parts of the system are designed for a numerical code particularly suited for use by the associated part without loss of the capability for synchronized operation of the complete system. Selected counters can be interconnected even though the numerical codes may be different. One of the selected counters is used to control the other as a function of system operations.

Therefore, it is an object of this invention to provide a simple system which has the capability of controlling the position of the machine and also reading out any position of the machine at command.

Another object of the invention is to provide an improved digital positioning system for algebraically summing the data representing the displacement of a machine member from a prior command position with data representing the difference between the prior command and a present command and for driving the member to a position represented by the sum.

A further object of the invention is to store the difference between a command position and the actual position of a machine member and to reduce the stored difference to zero as a function of the machine position when driving the member in a servo mode.

Still, another object of this invention is to provide a means for displaying the position of the machine on command.

A still further object of the invention is to provide the capability for interconnecting selected counters of the system and for controlling one counter with the other as a function of system operations.

Still a further object of this invention is to provide a position control system having linear servocontrol characteristics.

A further object of this invention is to provide a system for algebraically summing the difference in consecutive, command positions with the displacement of the actual machine position from prior command position for eliminating cumulative errors.

Another object of this invention is to provide a positioning system having a display of position error.

Still another object of this invention is to provide an improved position control system not requiring incremental programming.

BRIEF DESCRIPTION OF DRAWINGS

FIG. 2 is a schematic diagram of one embodiment of an incremental counter including detection logic.

FIG. 3 illustrates an example of velocity reduction.

FIG. 15 is a diagram of the function generator waveforms.

FIG. 16 shows a modification to the FIG. 2 logic for precisely selecting a final point.

DESCRIPTION OF PREFERRED EMBODIMENT

Figure 1A:
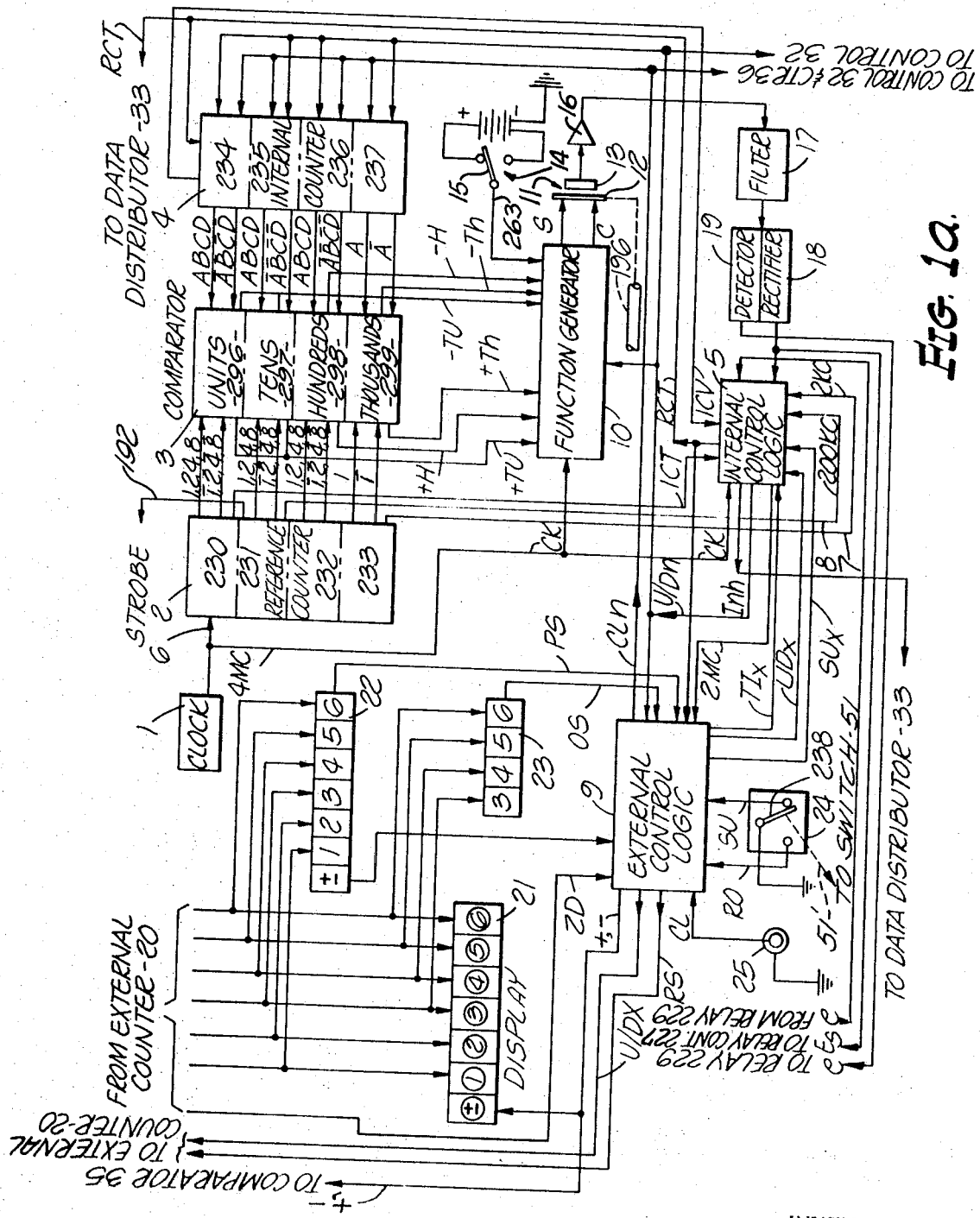
FIGS. 1a and 1b represent a functional block diagram of one embodiment of the invention.
Figure 1B:
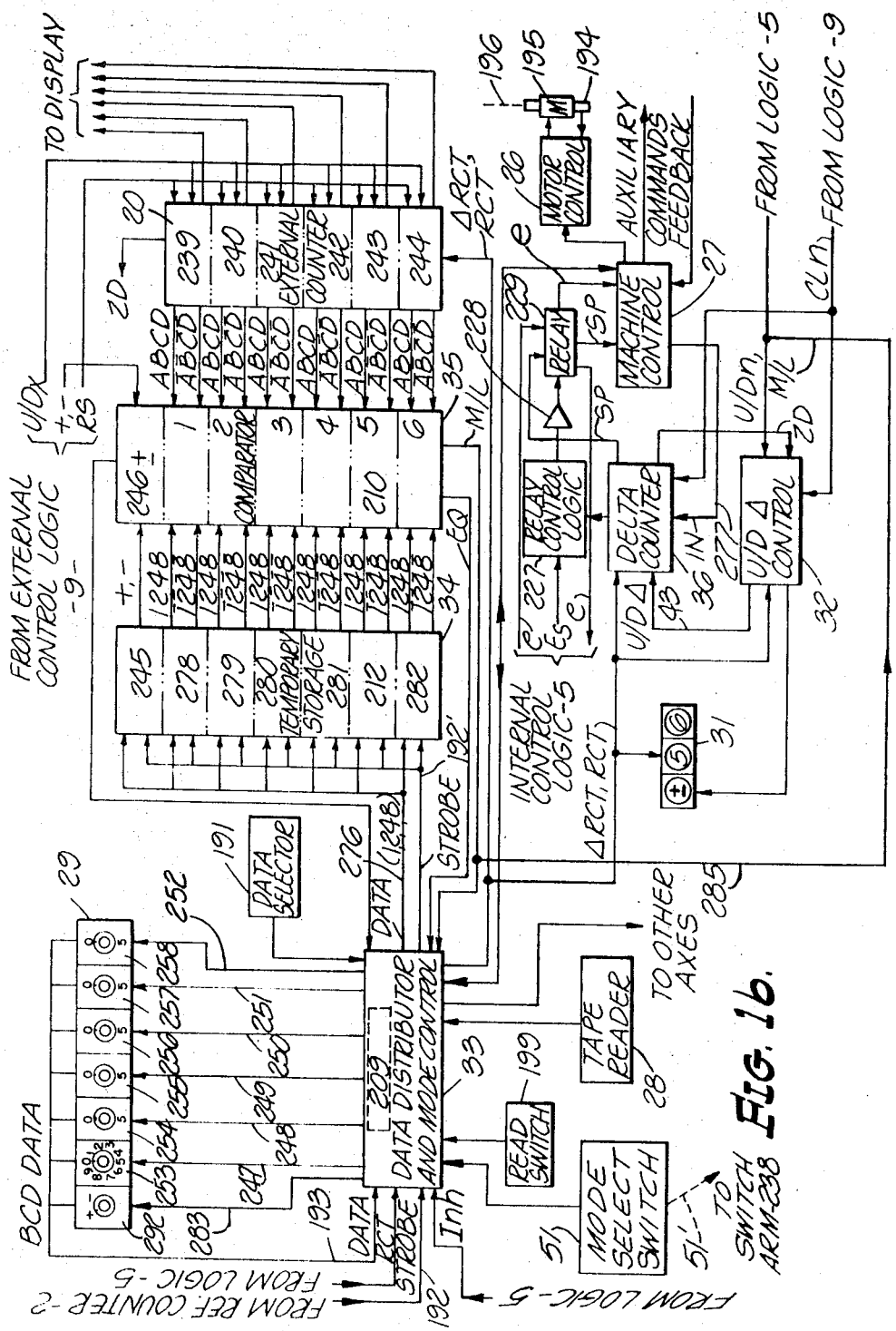

FIGS. 1a and 1b show a block diagram embodiment of a point-to-point positioning system for controlling the positioning of a movable member of the machine relative to a fixed part of the machine along one axis. The FIG. 1a portion, including the external counter of FIG. 1b, is described in the referenced patent application for a Position Measuring System, now abandoned.

Although machine members are not specifically illustrated by the drawings, the description assumes that the machine members are illustrated by the representations for the members of the position-measuring device. Additional control systems may be provided for each axis of a multiaxis machine.

The system includes clock generator 1 for generating a signal (CK) at, for example, a frequency of 4 megacycles which is used as a counting signal by reference counter 2 and as a timing signal by other parts of the system as described herein. The signal may be in the form of rectangular pulses which have a repetition rate equal to 4 mc. Although the output from the clock generator 1 is described as a signal, it should be understood to mean an alternating voltage level having the frequency indicated.

The clock signal may be produced by capacitor charge and discharge time through a resistor for controlling a gate output or by other circuits well known in the art.

Reference counter 2, which includes three decade counters 230, 231 and 232, furnishes signals proportional to the count in each decade on 1, 2, 4, and 8, and $\overline{1}, \overline{2}, \overline{4}$, and $\overline{8}$ binary coded decimal (BCD) conductors for the units (U), tens (T), and hundreds (H) counts. The thousands Th stage 233 which may comprise, for example, a JK flip-flop provides binary outputs at 1 and $\overline{1}$ for example, each time 1,000 clock pulses are received. The flip-flop receives the carry output from the hundreds decade 232. The count signals from each decade are compared in comparator 3 with corresponding signals from internal counter 4. The signals from internal counter 4 are proportional to the count in the internal counter 4. The counting signal for the internal counter 4, in the form of counter toggling (RCT) pulses, is generated by internal logic 5 as a function of error signal, $e$.

The 4 mc. signal is received at input 6 of the reference counter 2 and is divided into signals having frequencies of, for example, 2 kc. and 200 kc. The 2 kc. signal provides a basic counting rate for the system and the 200 kc. signal provides an increased counting rate for the system as subsequently described. For the embodiment described, a cycle of the reference counter 2 is divided into 2,000 equal parts i.e., the reference counter 2 counts 2,000 clock pulses each cycle. Other cycles and divisions are also suitable.

The 2 kc. and 200 kc. signals are connected to internal control logic 5 by conductors 7 and 8, respectively. The examples indicated above are used throughout the description of the embodiment of FIGS. 1a and 1b. It should be obvious that the system is not limited to the particular examples selected.

Similarly, although a combination of decimal, binary and binary-coded decimal numerical systems with corresponding circuitry is used in this description, it should be understood that other numerical systems are within the scope of the invention. For example, a straight binary numerical code and appropriate circuitry could also be used.

For the particular embodiment described herein, the internal counter 4 has a counting capacity equivalent to a cycle of the position-measuring device 11 so that its count represents the position of the movable machine member (illustrated as part of reference number 12) relative to the fixed machine member (illustrated as part of reference numeral 13) in a cycle of the measuring device 11. For example, if the measuring device 11 has a cycle of 0.2 inches, a count of one, assuming a 2,000 count cycle, would be equivalent to 0.0001 inches of movement.

Internal counter 4 includes three reversible decade counters 234, 235 and 236 for counting in binary-coded decimal and a binary stage 237 for counting straight binary. Each of the decade counters 234, 235, and 236 generate A, B, C, D and $\overline{A}, \overline{B}, \overline{C}, \overline{D}$ outputs representing units, tens and hundreds of RCT pulses counted by internal counter 4. The binary stage 237 generates A and $\overline{A}$ outputs representing thousands of RCT pulses counted by the internal counter 4.

Figure 4:
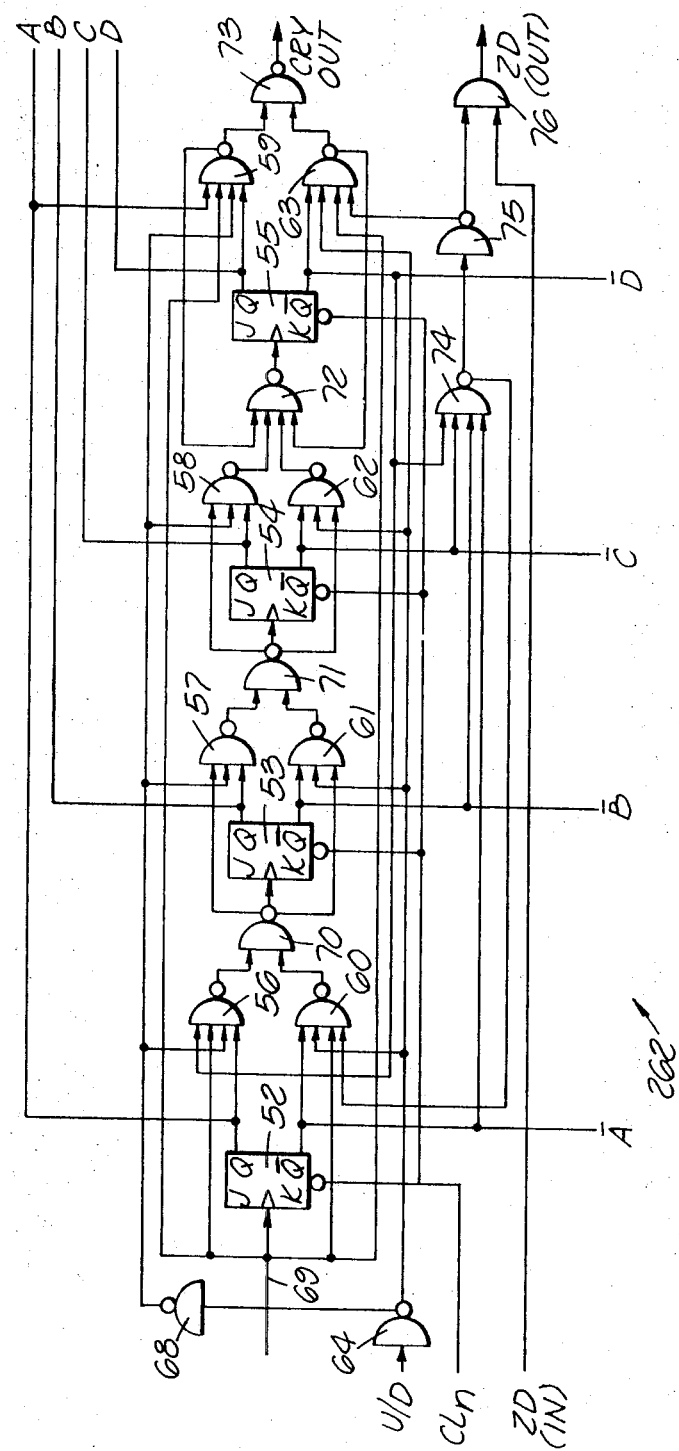
FIG. 4 represents an embodiment of one decade of a reversible counter usable in the system.

One example of a typical decade counter which could be used as a decade of the internal counter 4 is shown in FIG. 4.

The internal counter 4 receives $CL_n$ signals from external control logic 9 for setting the output counts to zero and a $U/D_x$ signal from the external control logic 9 for controlling the counting direction of the internal counter 4.

Comparator 3, which includes four comparison stages 296, 297, 298 and 299, compares counting signals from reference counter 2 with counting signals from internal counter 4. In one embodiment, the comparison stages 296, 297, 298 and 299 are implemented for example by NAND logic gates having inputs from internal counter 4 and reference counter 2. The comparator 3 may also include, for example, logic gates for converting the internal count from internal counter 4 into a nines complement prior to being compared with the reference count from reference counter 2.

Figure 6:
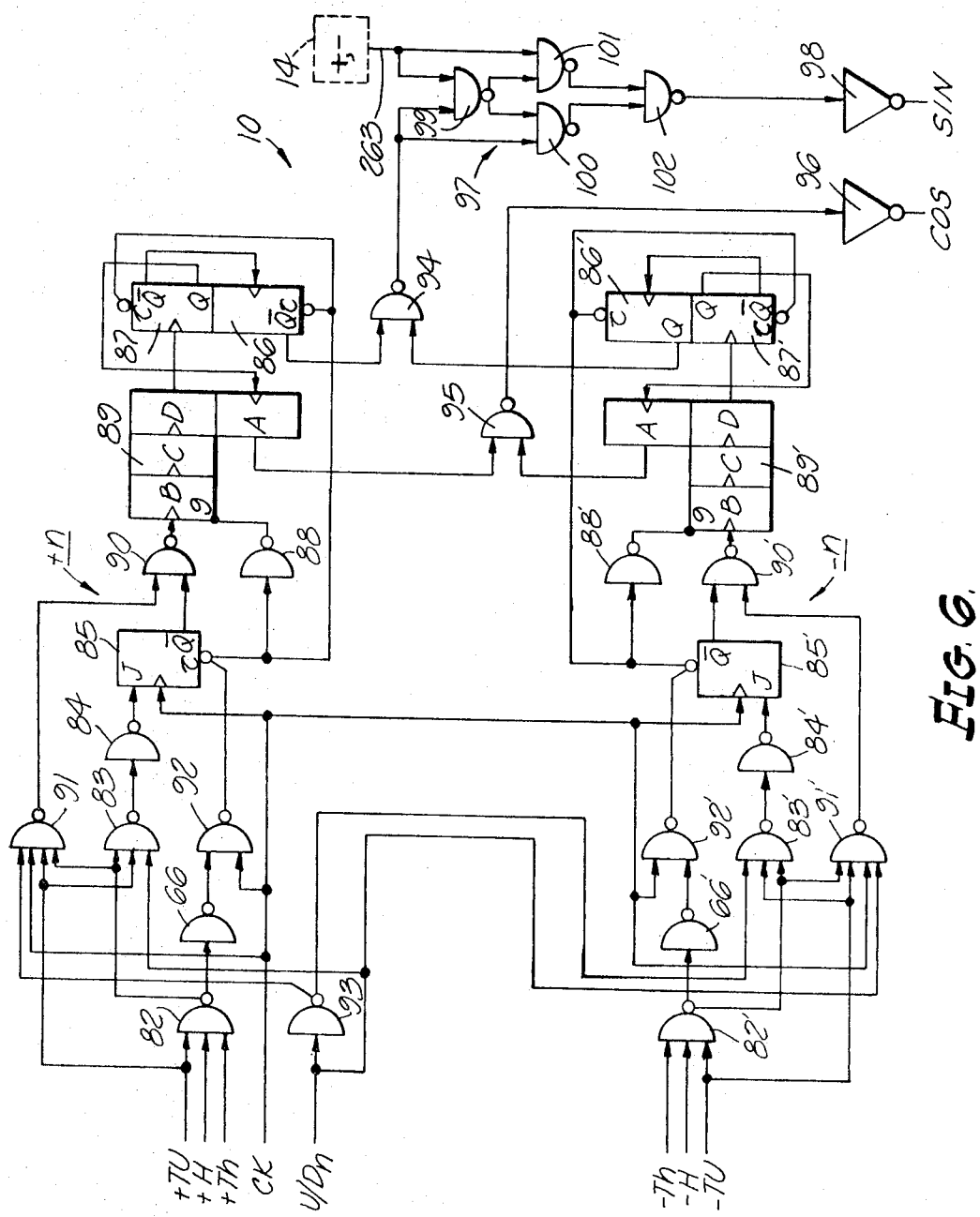
FIG. 6 represents one embodiment of a function generator usable in the system.

Whenever the count in the internal counter 4 coincides with the count in the reference counter 2, positive coincidence signals +TU (tens and units), +Th (thousands) and +H (hundreds) are generated as input signals to function generator 10. The TU conductors are connected together as a matter of design since the tens and units coincidence signals form common inputs to a gate in the function generator 10 as shown in FIG. 6.

Whenever the nines complement of the count in internal counter 4 coincides with the reference count, negative coincidence signals, −TU (tens and units), −Th (thousands), and −H (hundreds) are generated as input signals to function generator 10. The −TU conductors are connected together for reasons indicated above.

Overall positive and negative coincidence are referred to herein as coincidences in the +$n$ and −$n$ channels, respectively. As a result of using a nines complement, the −$n$ coincidence signal is early by one clock period. However, a flip-flop can easily be used for delaying the −$n$ signal by one period for correction of the data as shown in FIG. 6.

Function generator 10 uses the coincidence signals in the +$n$ and −$n$ channels to develop pulse width signals representing trigonometric functions for the input windings (part of movable member 12) of position measuring device 11 which comprises a position measuring transformer of the type described in U.S. Pat. No. 2,799,835, previously referenced. It is pointed out that although a particular type of position-measuring device is used in describing a specific system embodiment, other devices such as resolvers could be used.

The pulse width of the signals from the function generator 10 is determined by the spacing of the coincidence signals, −$n$ and +$n$, from a reference position. For the particular embodiment shown, the signals represent sine and cosine trigonometric functions indicated by S and C on the input conductors to position measuring device 11.

A more detailed analysis of the trigonometric relationship between the coincidence signals can be found by referring to patent application Ser. No. 645,161 for a Digital-to-Analog Converter by R. W. Tripp filed June 12, 1967, now U.S. Pat. No. 3,514,775.

The device includes movable member 12 positionable, for example, along an X axis and fixed to a movable member of the machine. Shaft 196 is shown connected to movable member 12 for positioning the movable member 12 and the movable machine member included in the representation of the movable member 12. The movable member includes polyphase windings such as a pair of multipolar primary windings phase shifted in space. Fixed member 13 of the device includes a continuous conductor forming a multipolar secondary winding for the device. The member is connected to a fixed machine member such as the frame of the machine.

The movable and fixed members 12 and 13, respectively, of the position-measuring device 11 may be either linear or rotary in form depending on the particular application of the system.

As is well known, in such a position-measuring device, the position of the movable member, with respect to the fixed member, can be represented by the relative displacement of the secondary winding with respect to the pair of primary windings. The displacement is represented as an angle measured in electrical degrees. It should be understood that the spacing of three consecutive conductors of the secondary winding corresponds to a cycle of 360 electrical degrees which is equivalent, for example, to 0.2 inches. For the example given, the device would pass through a cycle every 0.2 inches.

Sine reverse switch has a + and a − position for reversing the polarity of the sine signal into the position measuring device 11. By reversing the switch position, a positive number may be represented by either left or right machine motion relative to a reference on, for example, a workpiece.

The minus (−) input for reversing the polarity of the sine is connected to the function generator 10 when the arm 15 of the switch 14 is down. Arm 15 of the switch is shown connected to electrical ground for providing the relative low, or minus, input.

Preamplifier 16 is connected between fixed member 13 of the position measuring device 11 and filter 17 for amplifying the error signal from the position-measuring device 11. All harmonics except the basic frequency signal being used by the system, are filtered by filter 17. Filters and preamplifiers are well known in the art and for that reason details are not included. The error signal from the preamplifier 16 is changed into a sinusoidal signal having a magnitude as a function of the difference between the command position and the actual position of the movable member 12 in a cycle of the measuring device.

The output signal from the filter 17 is processed through phase detector 19 for generating a DC error signal, $e$. The error signal, $e$, has a polarity (sign) as a function of the direction of relative movement between the movable and fixed machine members. Phase detectors and associated circuitry for generating DC voltages are well known in the art. The error signal, $e$, is used in generating RCT pulses and an up/down control signal ($U/D_n$). In addition, as shown in FIG. 1b, the error signal, $e$, is used for driving a servomotor 195 during the servo mode.

The output signal from filter 17 is also processed through full wave rectifier 18 for generating frequency control signal, Es. The Es signal is also used as shown in FIG. 1b, for switching the system out of the servo mode under certain conditions. The signal has a DC voltage level as a function of the amplitude of the output signal from filter 17 and is used as described in FIG. 7 in changing the counting rate from one frequency to another as a function of its magnitude. Full-wave rectifiers and associated circuitry are also well known in the art.

Internal control logic 5 generates RCT counting pulses as a function of signals $e$, Es and the clock, CK. RCT pulses are inhibited as a function of changes in the sign of the error signal, $e$, for preventing oscillation of the least significant digit of the display 21. An inhibit signal (Inh) is generated for use by data distributor and mode control 33 shown in FIG. 1b.

Generation of the RCT pulses is synchronized within the internal control logic as a function of coincidence between units comparison signals, ICT and ICV, from the units decade 230 of reference counter 2 and the units decade 234 of internal counter 4. Synchronization is necessary, as described in detail with FIG. 7, to prevent counting errors.

Internal control logic 5 also generates a $U/D_n$ signal for controlling the counting direction of internal counter 4 and external counter 20 through external control logic 9. The logic state of the $U/D_n$ signal and therefore the counting direction is controlled by $UD_x$ and $SU_x$ signals generated by the external control logic 9 during a setup mode and by the sign of error signal, $e$, indicating direction of machine motion during a normal readout operation.

The frequency of the RCT pulses can be changed from 2 kc to 200 kc as a function of the mode of operation or the magnitude of the error signal as indicated by Es.

A 2 mc. counting signal is generated for use by external control logic 9 as described in connection with FIG. 8.

Figure 8:
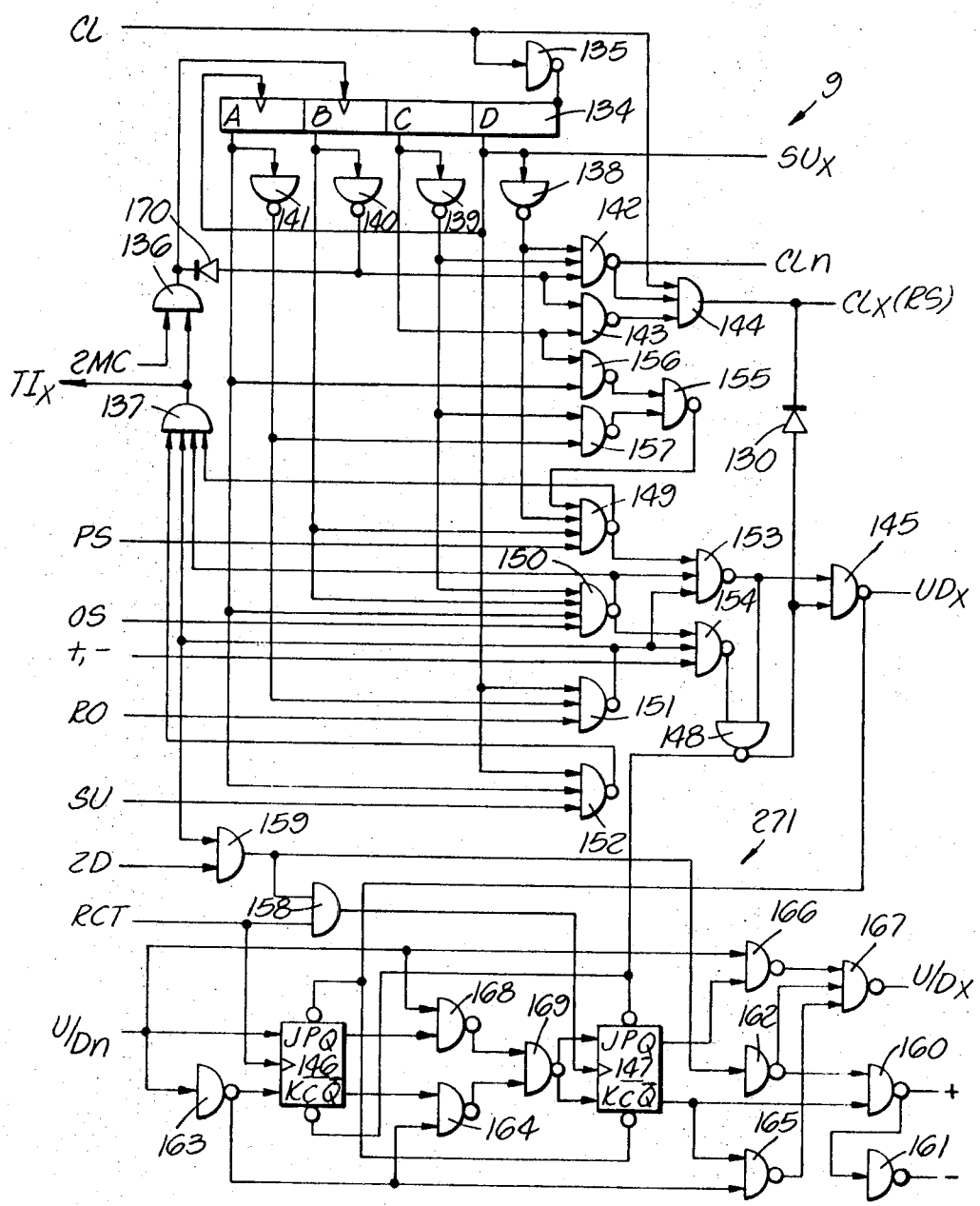
FIG. 8 represents one embodiment of external control logic for controlling the sequence of operations of the system during the setup and readout modes.

External control logic 9 includes a binary counter 134 counting at a 2 mc. rate (see FIG. 8). The count is decoded for controlling the sequence of system operations during the setup and readout modes. The external control logic 9 provides an up/down ($U/D_x$) signal for controlling the counting direction of external counter 20 (FIG. 1b) as a function of the direction of movement of the movable machine member represented by the logic state of the $U/D_n$ signal. A +, − signal is provided to the display 21 for displaying the sign of the number contained in the external counter 20. The display 21 is slaved to the external counter 20.

A reset signal (RS) is generated by the external control logic 9 to clear the external counter 20 and a $CL_n$ signal is generated for clearing the internal counter 4.

The external control logic is described in more detail in connection with FIG. 8.

Mode switch 24 includes readout (RO) and setup (SU) positions for controlling the mode of system operation. Conductors labeled RO and SU control the external control logic 9 as a function of the position of the arm 238 of the mode switch 24 and other conditions described subsequently. The arm 238 is connected to electrical ground for providing a relatively low input to the external control logic 9.

Reset switch 25 is connected to the external control logic 9 for resetting external counter 20 and display 21 to zero when it is desired to establish a new reference position and at the start of the setup mode. The switch 25 may be a pushbutton mounted on the front panel for applying an electrical potential to the external counter 20 for setting the counter 20 to logic zero. The input to the external control logic 9 from the reset switch 25 is designated as CL.

External counter 20, shown in FIG. 1b, comprises six reversible decade counters 239 through 244 of the type shown and described in detail in connection with FIG. 4. The 1, 2, 4 and 8 (BCD) output conductors from each decade counter are connected to the corresponding decades ① through ⑥ of display 21. One line is used to represent the output conductors from the four stages of each decade. It should be understood that four conductors would be connected between each decade and a display indicator. The single line is used for convenience.

The output conductors of external counter 20 are also connected to the respective 1, 2, 4 and 8 terminals of storage device 22 which stores the part starting number, or position. The conductors connected to the four least significant digits of the external counter 20 are connected to storage device 23 which stores the displacement, or offset, number determined during the setup mode as described in detail subsequently.

In addition, as described in FIG. 1b, the BCD bipolar outputs A, B, C, D and $\overline{A}, \overline{B}, \overline{C}$, and $\overline{D}$ from the counter 20 are connected to comparator 35.

Coincidence conductors, PS and OS, for storage devices 22 and 23, respectively, provide external control logic 9 with signals indicating coincidence between the count in the external counter 20 and the stored digits at appropriate times during the setup mode.

The offset storage device 23 may comprise four BCD thumbwheel switches connected to the least significant decades of the counter 20 (and the least significant digits of the display 21). The part start storage device 22 may comprise six thumbwheel switches and a sign switch connected to appropriate decades of counter 20 and the external control logic 9 (and the display 21). Other storage devices including relays, solid-state devices, computer storage, tape, etc. may also be used within the scope of the invention.

Display 21 may comprise six decimal-indicating cold cathode tubes and a sign indicating cold cathode tube including appropriate decoding and drive circuits for converting the BCD outputs from the counter 20 into decimal indications for the display 21. Other devices such as the examples given in connection with storage devices 22 and 23 could also be used.

In the preferred embodiment, the mode and reset switches, 24, 25, thumbwheel storage devices, 22, 23, and display 21 are mounted on the front panel.

As indicated above, the bipolar outputs (A, $\overline{A}$, etc.) from external counter 20 are one set of inputs to comparator 35. The other set of inputs to the comparator 35 are provided by temporary storage device 34.

An example of one decade of comparator 35 and one decade of temporary storage device 34 are shown and described in detail in connection with FIG. 9. The temporary storage device 34 includes a stage 245 for storing the sign of its data. The sign of the data in the external counter 20 is provided as a plus, minus output from the external control logic 9, to the +, − comparator state 246.

Data in the temporary storage device 34, representing a present command position, i.e., the position to which a movable machine member is being commanded to assume, is compared with data in the external counter 20 which represents the previous command position, i.e., the position to which a movable machine member was previously commanded to assume. If the data is equal, an equal signal, EQ, is generated.

If the data in the temporary storage device 34 is less than the data in the external counter 20, a less signal is generated from the comparator 35. The more/less signals are generated on the M/L line. The EQ and M/L lines are connected to data distributor 33 which directs counting pulses into external counter 20 and into the incremental, or delta counter 36 as described subsequently. A schematic embodiment of a delta counter 36 is shown in FIG. 2.

The counting direction of the delta counter 36 is controlled by up/down (U/D Δ) control logic 32 which generates an up/down counting control signal U/D Δ. A specific embodiment of the up/down (U/DΔ) control logic 32 is shown in FIG. 9. The up/down control logic 32 receives RCT pulses, a $CL_n$ signal, M/L and $U/D_n$ signals. Those signals set the output, line 43, on the up/down control logic 32 for controlling the counting direction of the delta counter 36.

RCT and ΔRCT pulses are directed by the data distributor 33 to the external and delta counters (20, 36) as described subsequently. ΔRCT pulses load the delta counter 36 with the computed difference between the data contained in the temporary storage device 34 and the external counter 20. RCT pulses reduce the count in the delta counter 36 towards zero as the movable machine member is positioned from one point to another on a workpiece (not shown).

The delta counter 36 receives an "IN" signal on line 277 as described in connection with FIGS. 2 and 13.

Position error display device 31 is connected to the delta counter 36 to visually display the least significant digits of data in the delta counter 36. After a machine has been positioned, the display 31 indicates the position error. The display 31 which may comprise a two stage counter, is loaded by ΔRCT pulses during the transfer of pulses to the external counter 20 and is unloaded by RCT pulses during the positioning of operation. A plus, minus indicator, ±, controlled by up/down delta control (U/DΔ) logic 32 is also shown for displaying the sign of data in delta counter 36.

As the ΔRCT pulses load the delta counter 36, the two digits are also loaded. The carry from the most significant digit is dropped.

The display 31, therefore, counts and displays any number between 00 and 99. This numerical range would represent a linear range of 0.0000 to 0.0099 inches. When loading operation is complete, the display 31 will contain the least two significant decimal digits of the number in the delta counter 36.

Conversely, as the RCT pulses unload the counter 36 during the positioning cycle, the display 31 will also be unloaded. If the final machine position is exactly as commanded, both the delta counter 36 and error display 31 will be unloaded to zero. If, however, the machine (not shown in detail) does not position as commanded, a numerical residue, equivalent to the error, will exist and appear at the display 31. A light may be added to indicate if the error is in excess of the digits displayed.

A serial detection circuit (not shown) and a selector switch (not shown) may be added for selecting an output from the delta counter 36 corresponding to the desired stop point. The operator could optimize the location of the final stop point and minimize any error which may exist after the machine has coasted to a stop.

Operator selection of whether the inventive position control system is to function in the SETUP, READOUT or POSITIONING mode is achieved by means of mode select switch 51 (FIG. 1b). Linkage 51' connects mode select switch 51 to arm 238 of switch 24 so as to insure proper SU or RO input to external control logic 9 during setup and readout operation, respectively. In the various positioning modes described hereinbelow, switch 51 cooperates with circuitry in data distributor and mode control 33 to advance switch 209 (FIG. 11) to the appropriate setting.

Figure 11:
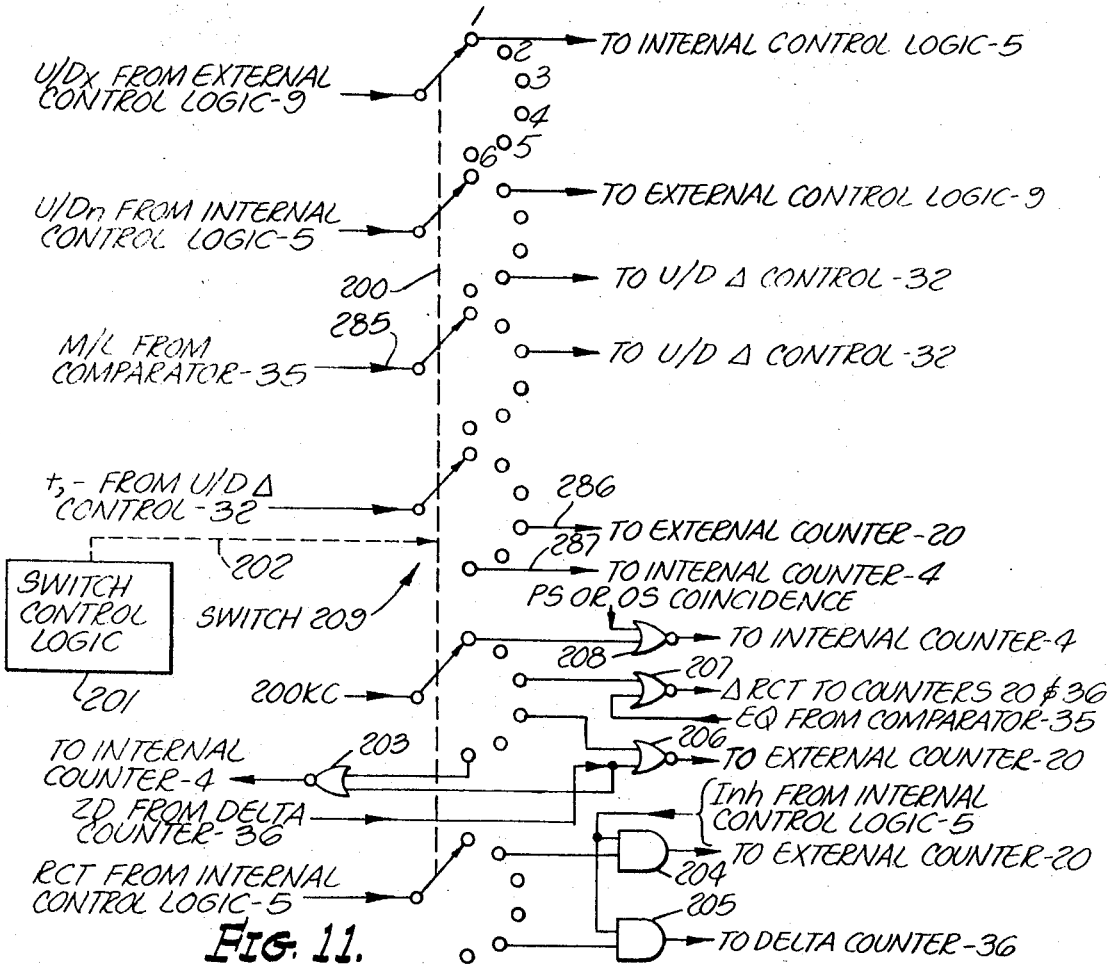
FIG. 11 is a schematic diagram of a circuit for switching into a servo mode as a function of the count in the incremental counter.
Figure 12:
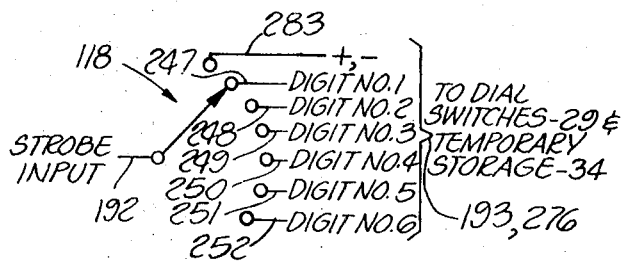
FIG. 12 illustrates a switch usable in the data distribution for transferring data into the temporary storage device.

Data distributor and mode control 33 controls the distribution of data from one of a plurality of sources including dial switches 29 and tape reader 28 to temporary storage 34 and to machine control device 27 or to systems for controlling other axes of a multiaxis machine. In a simple embodiment the data distributor 33 may be implemented by manual switches as shown in FIGS. 11 and 12. In a more complex embodiment, counters and logic gates could be used. The data distributor 33 receives a strobe signal on line 192 from reference counter 2 for synchronizing the transfer of data into storage device 34.

Information stored on perforated tape (not shown) in the tape reader 28 would be coded to address one of the plurality of axes, indicate the coordinate position to which machine member (reference numeral 12) was to be driven along the addressed axis, or command an auxiliary operation. The data distributor 33 decodes the address and provides the appropriate command signals to the addressed axis.

Depending on a particular application, a tape reader 28 could be a mechanical or high-speed optical device for reading multitrack data contained in consecutive rows on perforated tape (not shown). Details on tape readers, usable within the scope of the invention are known to persons skilled in the art and are not included.

Machine control device 27 may, for example, be composed of relays, gating logic, etc., for providing control signals to motor control device 26 and signals to other parts of the machine (not shown) representing auxiliary commands. The machine control device 27 also receives feedback signals indicating the response of the machine to the auxiliary commands. SP and $e$ input signals to machine control device 27 are processed through relay 229 as a function of the system-operating mode. For example, the relay 229 may be a double pole double throw device so that the error signal, $e$, can be switched from the internal control logic 5 to the machine control device 27 for driving the motor 195 during the servo mode. For slowdown and stop operation, the motor 195 is controlled by slow down and stop signals (SP). Relay control device 227 generates a signal to relay driver 228 for actuating the relay 229 when the detected servo count is greater than the magnitude of the frequency control signal, Es. Es has a magnitude proportional to the machine position error.

It should be pointed out that in a practical embodiment, the devices described herein as comprising the system would be interconnected for one mode or the other so that the necessity for switching from one mode to another would never arise. However, if desired and as described herein, a switching device (relay 229) can be used to switch from one mode to another without difficulty.

Data selector 191 determines whether or not data to be distributed is received from the tape reader 28, a computer (not shown) or the dial input switches 29. It can be set in either a tape (automatic or continuous) or a dial mode. Input data may also be accepted from other sources.

Read switch 199 may comprise a pushbutton switch for enabling the data distributor 33 to begin reading the data from the selected source. The switches 199 and 191 may be used with embodiments other than the embodiment shown in FIGS. 1a and 1b.

Dial input switches 29 may comprise six manually operated switches 253 through 258 which can be rotated to a selected position. A +, − switch 292 indicates the sign of the data. The decimal numbers set into switches 253 through 258 are converted into BCD numbers and sequentially transferred into the temporary storage 34 through data distributor 33 upon receipt of strobe signals on lines 247 through 252 which also goes to storage device 34. The rotating arm (shown in switch block) of each switch of input switches 29 is connected to the strobe lines 247 through 252 from data distributor 33 so that each switch is sequentially actuated for transmitting data to the storage device 34 via line 276 through the data distributor 33. The 1, 2, 4 and 8 conductors for each switch are common to 1, 2, 4, and 8 conductors from the other switches. Similar dial switches would be provided for each axis of the machine.

Motor control device 26 receives signals from the machine control device 27 as a function of the operating mode of the system. The motor control device 26 may be comprised of clutches and brakes, servo electronics, hydraulic controls, etc., for controlling the dynamic characteristics of motor 195 in response to the signals. The motor is connected by shaft 196 to the movable member 12 of the position-measuring device 11 shown in FIG. 1a.

Tachometer 194 provides velocity feedback to the motor control device 26 during certain phases of the system operation.

FIG. 2 illustrates a functional block diagram of delta counter 36 including logic 119. The counter comprises 20 binary stages which may for example be implemented by flip-flops and interconnecting logic gates. The stages $2^0$ through $2^{19}$ are connected in cascade so that the output from one stage provides an input to the next stage.

The first, or $2^0$, stage receives input signals ΔRCT and RCT for loading and unloading the counter 36 respectively. ΔRCT pulses are provided by the distributor 33 for loading the counter 36 to the difference between a new command position and the prior command position. Any residual count in the counter 36 is algebraically added to that difference. RCT pulses are produced by the internal control logic 5 as the machine is driven towards the new command position for unloading the counter 36.

Detection logic 119 is implemented by series connected NOR gates. The logic one output from each stage of the counter 36 provides an input to a NOR gate, for example, NOR-gate 259 associated with the 16th stage. If both inputs to the NOR-gate 259 are low, the output is high. Another input to the NOR-gate 259 is received from a NOR gate, for example, NOR-gate 260 interconnected between NOR gates associated with each stage. A high output is inverted by the interconnecting NOR gate.

As a result, if both inputs to a NOR gate are low, the output will be high, and the output from the interconnecting NOR gate will be low. If one of the inputs to the NOR gate is high, the output will be low and the remaining gates of the detection logic 119 are inhibited.

The output from the last NOR-gate 261 of the series combination provides an indication of a zero condition (ZD) for the counter 36. The zero detect signal (ZD) may result from a clear ($CL_n$) signal generated by the internal control logic 5 at the beginning of system operations or as a result of being counted to zero during the loading and unloading process. The zero condition is used as described in connection with FIG. 9 for controlling the counting direction of a delta counter 36.

Logic gating combinations including NAND-gate 121, AND-gate 122, NAND-gate 197, AND-gate 198, NAND-gate 188, and AND-gate 189, provide output signals SP1, SP2 and SP3, respectively. These logic circuits detect the counts at which the machine is to be slowed down and stopped, as shown graphically in FIG. 3 for a specific example. The last point could be used to switch the system into a servo mode.

Figure 9:
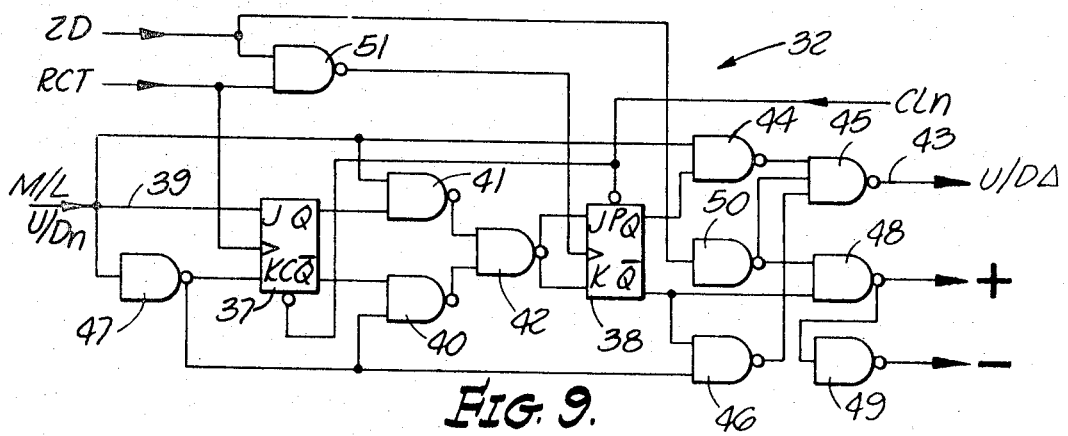
FIG. 9 is a schematic diagram of logic for controlling the counting direction of the incremental, or delta, counter.
Figure 10:
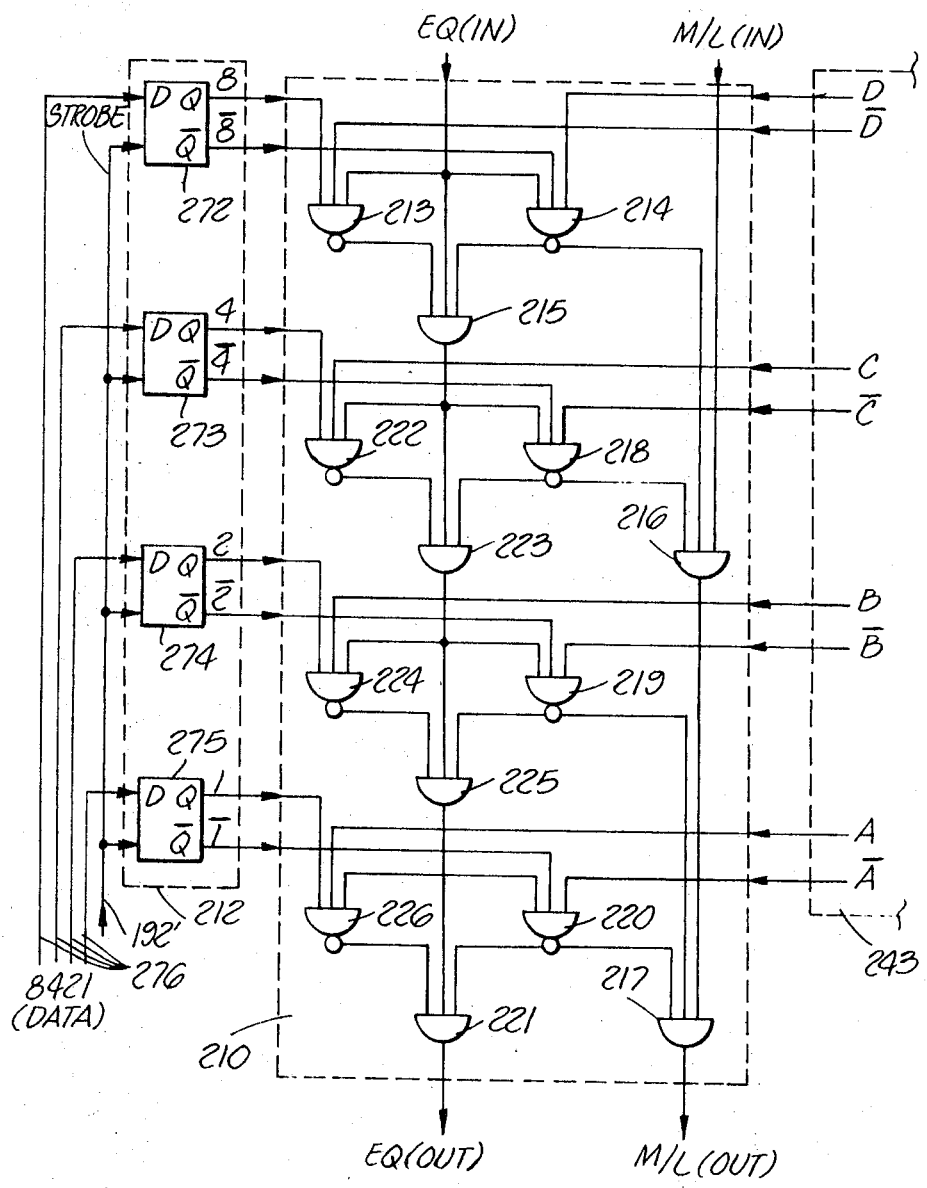
FIG. 10 is a illustration of one comparison decade between one decade of the temporary storage device and one decade of the external counter.

The delta counter 36 is described more specifically in connection with FIGS. 9 through 11 and generally in connection with FIG. 3. FIG. 3 is used subsequently herein in describing the operation of the system.

FIG. 4 illustrates one embodiment of a reversible BCD counter 262 which can be used as a decade of the counter described in connection with FIG. 1. For example, six such counters would be used in implementing external counter 20 and three counters could be used with one flip-flop for implementing internal counter 4. The Q and $\overline{Q}$ outputs from the JK flip-flops 52 through 55 represent BCD bits $1, \overline{1}, 2, \overline{2}, 4, \overline{4}, 8, \overline{8}$, respectively.

NAND-gates 56 through 59 control the flip-flops 52 through 55 when the decade 262 is counting up and NAND-gates 60 through 63 control the flip-flops 52 through 55 when the decade 262 is counting down. The U/D inputs to NAND-gate 64 determine whether or not the decade 262 is set to count up. In that case, the low output from gate 64 is inverted by Nand gate 68 to set the decade 262 to count up. In the event the input to gate 64 is low, the output is high and the decade is set to count down.

Each flip-flop (52 through 55) can be cleared to zero by RS signal generated by reset switch 25 if the decade 262 is part of external counter 20 or by a clear signal, CL, if the decade 262 is part of internal counter 4.

Input pulses to the decade 262 are received on conductor 69 designated as RCT or CRY IN. The decade 262 could be the first stage of either counter 20 or counter 4 and therefore be receiving RCT pulses or it could be a subsequent stage of one of the counters (20, 4) and therefore be receiving carry (CRY) pulses.

NAND-gates 70, 71 and 72 provide the proper output voltage level as to switch, or toggle, the flip-flops 53 through 55 of the decade from one state to another. NAND-gate 73 provides a carry (CARRY OUT) to the next decade (not shown).

For the particular embodiment shown, gate 76 has been added to determine when the decade 262 has a zero count. The zero detect capability is used by external control logic 9 to determine the setting of the $U/D_x$ signal. Additional details are described and shown in connection with FIG. 8 for the external control logic 9.

Assuming the decade 262 has been cleared and U/D is high, a pulse received at the input of flip-flop 52 sets the Q output high. No other flip-flop would be set since NAND-gates 56 through 59 would be inhibited by the zero setting of the flip-flops 53 through 55, prior to receipt of the first pulse.

Upon receipt of the next input pulse, the Q output from flip-flop 2 changes states from high to low. The output from gate 56 is high, thereby setting the output from gate 70 low upon receipt of the next clock pulse for setting the Q output from flip-flop 53 high.

The counting sequence is continued until the decade 262 contains a count of 9, at which time the output from NAND-gate 59 is set low. The next count pulse then sets the Q output of flip-flop 55 low and produces a carry output from NAND-gate 73 into the next decade (not shown).

When all the $\overline{Q}$ outputs are high, thereby indicating a zero condition (ZD), NAND-gate 74 is set low and NAND-gate 75 is set high. When a zero condition is detected for a preceding decade (not shown), as indicated by a high signal on the ZD IN conductor, the output of AND-gate 76 to a succeeding decade (not shown) is high.

Figure 5:
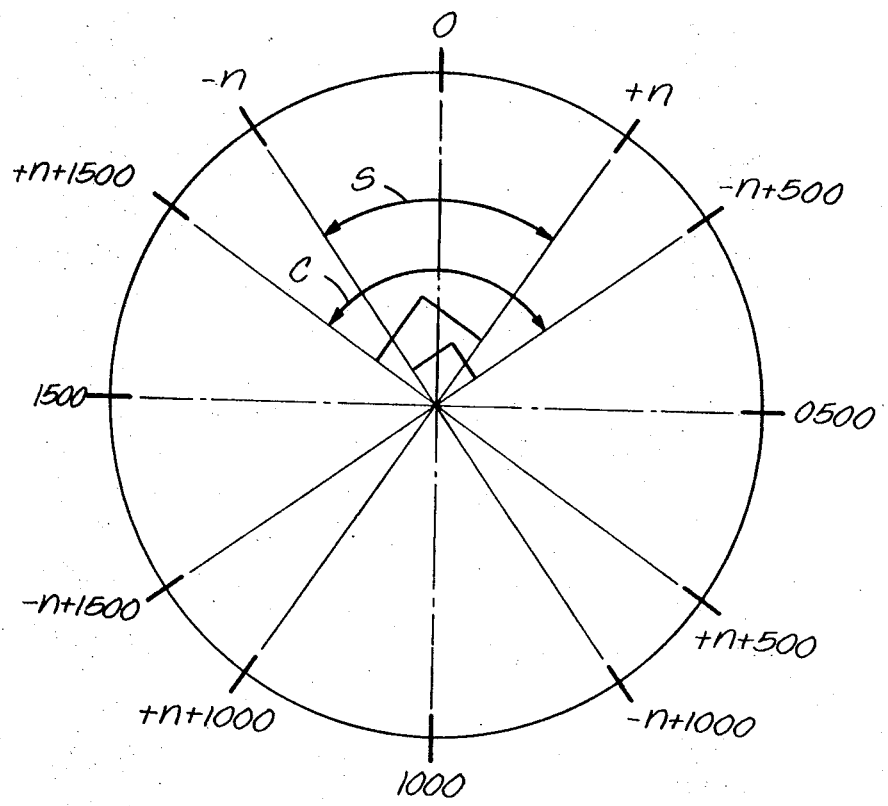
FIG. 5 is a vectorial illustration of the relationship between pulses used in generating signals representing trigonometric functions.

FIG. 5 is a vectorial representation of coincidence signals, or pulses, $+n$ and $-n$ generated by the comparator circuits of the system.

The circle (360°) represents a cycle of the reference counter beginning at reference position "0". For the assumed example, the circle is divided into 2,000 equal intervals so that each interval, or count, is equivalent to an angle measured from the reference position. For example, a count of 1 in the internal counter 4 would be equivalent to an angle of 0.18°, as the count increases, the angle represented by the count increases.

The pulses represented by the vectors are equally spaced on both sides of the reference to eliminate errors caused by undesirable phase shifts in the system. Phase shifts in the system cause both pulses to be shifted in the same direction relative to the reference. As a result, the pulse separation and, therefore, the command position remains the same. Addition methods for producing sine/cosine analog waveforms usable by the system as alternatives to the method described and shown, can be seen by referring to U.S. application Ser. No. 645,161 for a Digital-to-Analog Converter by Robert W. Tripp, filed on June 12, 1967 now U.S. Pat. No. 3,514,775.

Other signals, or pulses represented by vectors $-n+500$, $+n+500$, $-n+1,000$, $+n+1,000$, $-n+1,500$, $+n+1,500$ are also generated by the function generator 10. By properly selecting pulse, pulse width analog signals can be generated which represent trigonometric functions in various quadrants of the circle.

Although not shown in FIG. 5, but as will be described in connection with FIG. 6, each pulse is displaced from the reference position by an additional interval of 100.

FIG. 6 illustrates one embodiment of function generator 10 for generating analog signals representing sine and cosine trigonometric functions as a function of count coincidence between reference counter 2 and internal counter 4. The pulse width signals may be described as position command signals to position measuring device 11.

Since the $+n$ and $-n$ circuitry is in part identical only the $+n$ channel is described in detail. Primes of the numerical designations used in describing the $+n$ channel are used in designating identical circuitry in the $-n$.

The $+n$ channel comprises NAND-gate 82 having coincidence inputs +TU, +H and +Th from comparator circuits within comparator 3. The output from gate 82 comprises an input to NAND-gate 83 which also has an input from the +TU coincidence comparator within comparator 3. The output from NAND gate comprises an input to and is inverted by Nand gate 84.

The output from Nand gate 82 also is directed through NAND-gates 66 and 92 to provide a signal for clearing JK flip-flops 85, 86 and 87. In addition, the output from gate 92 is inverted by NAND-gate 88 which has its output connected to counter 89 to preset the counter to state nine (A B C D=1,001). The B stage of counter 89 is also driven by the output from NAND-gate 90 which has inputs from NAND-gates 91 and the $\overline{Q}$ output of flip-flop 85. Counter 89 is a decade counter used in a biquinary mode, i.e., a scale of five followed by a scale of two.

Counting is initiated by overall coincidence in the $+n$ channel followed by counting signals when coincidence is detected between the tens and units counts of the internal counter 4 and the tens and units counts of the reference counter 2.

Each TU coincidence causes the binary counter 89 to increase by a count of one. If the counting rate is increasing, the TU coincidence occurs at a faster rate and the rate of the sine/cosine pulse width signals is increased. When the machine movable member (numeral 12) is at rest, TU coincidence occurs every 100 clock pulses. As a result, since a cycle is 2,000 clock pulses, counter 89 counts 20 times during one counting cycle of reference counter 2. However, when the machine member is moving, the internal counter 4 is changing counts so that each TU coincidence occurs at a different count depending on whether the internal counter 4 is counting up or down. For example, if the system is operated at a counting rate of 200 kc., and the counter 4 is counting up, TU coincidence would occur each 125 clock pulses instead of each 100.

In toggling, or causing a change in the count of, counter 89, NAND-gate 90 receives one input from NAND-gate 91 which itself receives inputs from the +TU line, from the clock (CK) line, and from the $U/D_n$ line inverted by NAND-gate 93. NAND-gate 90 also receives an input from the $\overline{Q}$ output of flip-flop 85.

Flip-flop 86 is driven by the $\overline{Q}$ output of flip-flop 87. The $\overline{Q}$ output of flip-flop 86 drives NAND-gate 94.

Flip-flop 87 is driven by the D stage of counter 89. The Q output of flip-flop 87 drives the A stage of counter 89 which provides an output to NAND-gate 95.

As previously indicated the $-n$ channel comprises similar circuitry for providing inputs to gates 94 and 95.

The output from NAND-gate 95 drives inverting amplifier 96 for producing a rectangular signal having a width proportional to the angle represented by the count in the internal counter 4. Gate 96 remains on for a period proportional to the count and for the interval between coincidence pulses as described in connection with the vector diagram, FIG. 5.

NAND-gate 94 similarly remains on to produce a rectangular signal proportional to the angle represented by the count in the internal counter 4. The output from NAND-gate 94 passes through the sign reversing logic 97 to inverting amplifier 98.

Sign reversing logic 97 comprises NAND-gates 99, 100, 101 and 102 for inverting the signal of the rectangular signal from NAND-gate 94. When the input line 263 from switch 14 (see FIG. 1) is relatively high potential, such potential is applied to the inputs of gates 99 and 101 for inverting the signal. As a result, the relative position and negative directions of machine movement can be reversed. For example, if the arm 15 of the switch 14 is up, positive motion of the machine could be in a first direction, whereas if the arm 15 of the switch 14 is down the positive motion would be in the opposite direction.

In operation, when NAND-gate 82' of the $-n$ channel detects coincidence between the reference count and the complement of the internal count, its output goes low. For the example, it is assumed that the internal counter 4 is counting down and the U/D line is low.

When the output of gate 82' is low, after flip-flops 85', 86' NAND-gate 87' had been cleared to a zero stage, NAND-gate 88' is high and counter 89' is set to a count of 9 or one below its capacity, the D and A stages are set to logic one states, the B and C stages are logic zero.

During coincidence, the output of gate 83' is high and the output of NAND-gate 84' is low. Therefore, flip-flop 85' remains unchanged.

At the next TU coincidence, approximately 100 clock pulses, or counts, following $-n$ coincidence, NAND-gate 84' is set high so that upon receipt of the next clock pulse (CK), NAND-gate 91' is set low and NAND-gate 90' is set high to add a count of one to the count of 9 in the counter 89'. As a result, the B, C and D stages are set to logical zeros. The output from NAND-gate 82' is high since there is a lack of coincidence between the $-Th$ and the $-H$ lines. Since flip-flop 85' was interposed between NAND-gates 84' and 90', a one bit delay is incurred. The one bit delay converts the nines complemented number, $-n$, into a tens complement and is used as described subsequently in inhibiting display oscillations.

When the D stage toggles, flip-flop 87' is set high and flip-flop 86' is set high.

Five hundred counts following $-TU$ coincidence, the D stage again changes from a logical one to a logical zero and flip-flop 87' is set low. As a result, the A stage of counter 89' is set low. Therefore, one input to NAND-gate 95 is low and the output from inverting amplifier 96 is low. Previously, the inverting amplifier 96 was set high when the A stage of the counter 89 was set high. When both A stages were high, both inputs to NAND-gate 95 were high and the output from inverting amplifier 96 was high.

NAND-gate 94 receives inputs from $\overline{Q}$ output of flip-flop 86 and the Q output of flip-flop 86'. The 86' Q output is set high at $-n+100$ when the 86 $\overline{Q}$ output is high. Therefore, the output from NAND-gate 94 is set high. Subsequently, at $+n+100$, the flip-flop 86 $\overline{Q}$ output is set low so that the output from NAND-gate 94 is set low. Therefore, gate 94 is set low during the period from $-n+100$ to $+n+100$. Inverting amplifier 98 provides a high output during that period unless switch 14 is operated to reverse the polarity of the input signal to inverting amplifier 98.

The relationship of the output signals from flip-flops 86, 86', 87, 87' and from the A stages of the counters, 89 and 89', is shown more clearly in FIG. 15. The output 86 $\overline{Q}$ from flip-flop 86 and the output 86' Q from flip-flop 86' both are used in producing the sine output signal. As indicated by the signals, inverting amplifier 98 for the sine signal turns "on", or high when the Q output from flip-flop 86' goes high, and turns "off", or low, when the $\overline{Q}$ output from flip-flop 86 goes low, assuming that the reversing input from switch 14 is low, thereby causing the outputs of gates 94 and 102 to agree.

Cosine inverting amplifier 96 turns on when the Q output of the A stage of counter 89 goes high and turns off when the output from the A stage of counter 89' goes low.

The midpoints of both signals are seen to be equally displaced by 100 clock periods from zero reference position of reference signal, R. The count of the reference counter 2 is represented by the dashed signal superimposed over the reference signal.

The period during which inverting amplifier 98 is on provides a rectangular signal which can be filtered to provide a sinusoidal signal having an amplitude proportional to the sine of the angle represented by the count in the internal counter 4. Filter 17 for the embodiment shown is placed at the output of the position-measuring device 11 instead of in each channel of the input. By increasing the width of the signal, as when the count increases, the amplitude of the sinusoidal signal can be increased. For the particular example shown in FIG. 15 the angle is 18° for a count of 100.

When the error signal, $e$, is reduced through zero when counting up, for example, the sign of the error signal, $e$, changes and therefore the U/D line changes from high to low.

At the trailing edge of the clock pulse following the detected +TU coincidence, when counting up in the +n channel when U/D$_n$ is high, flip-flop 85 is set high. At the trailing edge of the next clock pulse, occurring at $n+100+1$ time, gate 90 supplies a counting pulse to counter 89. At $-(+n+1)+100$ time when U/D$_n$ is high, gate 90' supplies a counting pulse to counter 89'. Herein the term $-(+n+1)$ represents the nines complement of the number $n$.

Similarly, at $-(+n+1)+100+1$ time, gate 90' supplies a counting pulse to counter 89' when counting down when U/D$_n$ is low. Also when U/D$_n$ is low, gate 90 supplies a counting pulse to counter 89 at $+n+100$ time.

When the movable member 12 of the measuring device 11 is positioned at a desired location, the internal counter 4 increases in response to the error signal, $e$. As the internal counter 4 increases the error signal is reduced in magnitude. Therefore, when the internal count coincides with the position of the movable machine member 12 the error signal $e$ changes from one polarity to another value because of the one bit delay provided by either flip-flop 85 or 85'. For example, when the internal counter 4 is counting up, a one bit delay is incurred through flip-flop 85. If the internal counter 4 is counting down, the one bit delay is incurred through flip-flop 85'.

When the error signal, $e$, changes from one polarity to the other, the U/D$_n$ line changes states and the next RCT pulse to the internal counter 4 is inhibited as described in connection with FIG. 7. The display 21 then indicates the position contained in the external counter 20.

When U/D$_n$ is low, the Q output of flip-flop 85' will be switched low at $-(+n+1)+100$ flip-flop 85 of the +n channel with be bypassed. The SIN output of inverting amplifier 98 driven high one bit later at $-(+n)+100$ and will be driven low at $+n+100$ instead of at $+n+100+1$.

Although the internal count has not changed, switching the one clock period delay from flip-flop 85 in the +n channel to flip-flop 85' in the $-n$ channel introduces the effect of a one down count. The change in the error signal, $e$, from negative to positive causes the U/D$_n$ line to change from high to low thereby effecting the delay transfer from flip-flop 85 to flip-flop 85'. The RCT line would again be inhibited and the internal count would remain unchanged.

With the U/D$_n$ line again high after the error signal has caused another U/D$_n$ change, the $\overline{Q}$ output of flip-flop 85 counter, become low at $+n+\Phi$ and flip-flop 85' would be bypassed as indicated above. In other words, gates 91 and 92 would be inhibited. The data would seem to have been increased by a count of one.

The process of switching the U/D$_n$ line, thereby transferring the delay between the +n and $-n$ channels, would continue until the measuring device 11 is moved to a new position. In that case, normal counting operations would be resumed.

It should be noted that other combinations of outputs from the A stages, and the flip-flops 86, 86', 87, 87' can be used to control gates 94 and 95 for generating pulse width signals between other coincidence pulses as described in connection with FIG. 5. Appropriate connections to gates would be required. It should be pointed out that the present sine and cosine signals have a phase center at a reference count of 0100. The phase center can be changed to other positions by connecting other outputs to gates 94 and 95.

Figure 7:
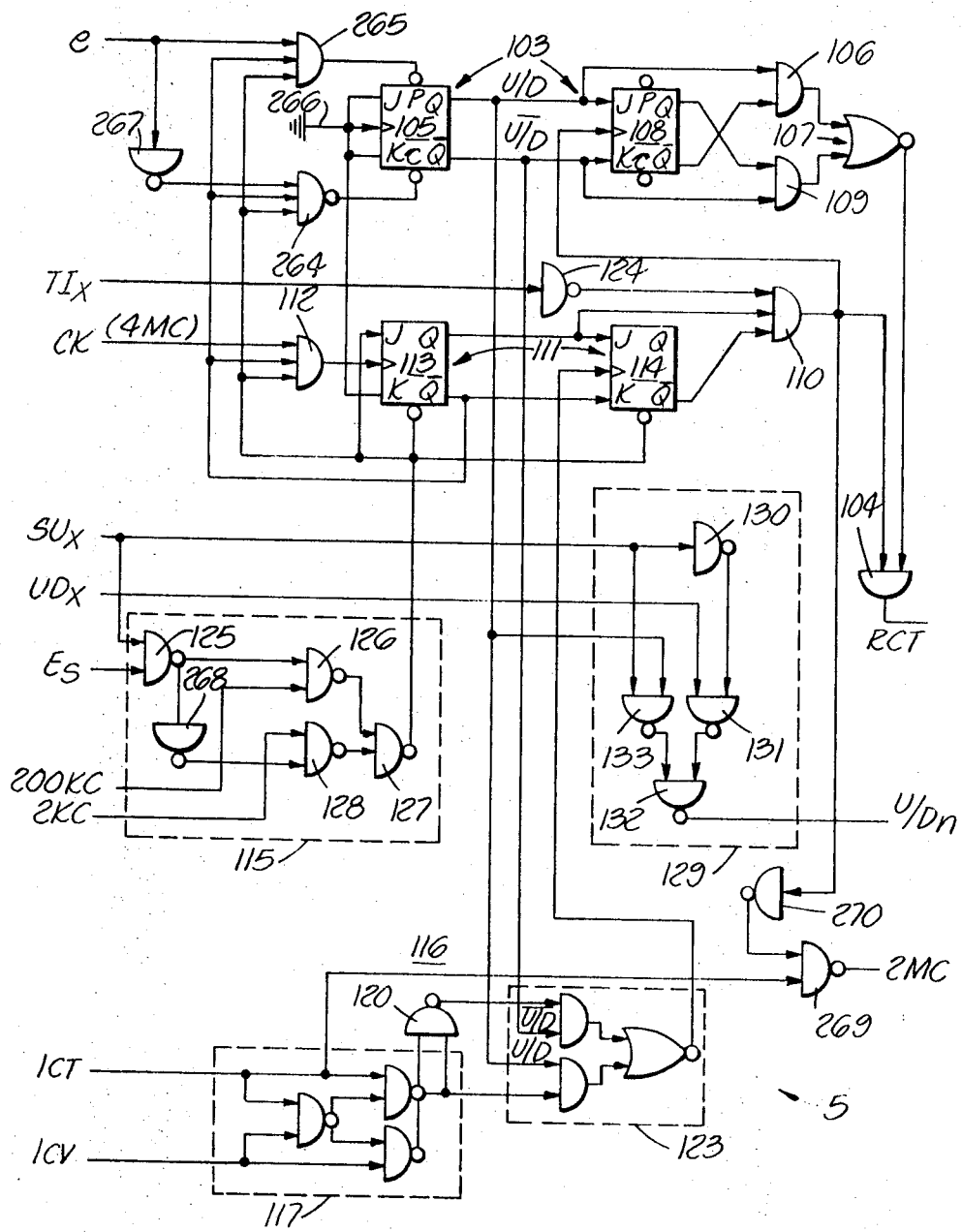
FIG. 7 represents one embodiment of internal control logic for controlling the internal counter and function generator during system operations.

FIG. 7 shows one embodiment of internal control logic 5 including inhibiting logic 103 for inhibiting or enabling AND-gate gate 104, U/D line whether the error signal, $e$, has changed signs as a result of the last change in internal count.

Assume, for example, that the error signal, $e$, from the previous count had been positive. As a result, the U/D line from flip-flop 105 will be high. The next error signal, $e$, changed from positive to negative, the U/D line would change from high to low.

The clear, $c$, and preset, $p$, inputs to flip-flop 105 are provided by NAND-gate 264 and gate 265, respectively. The triggering input 266 is connected to ground. NAND-gate 267 provides an inverted error signal, $\bar{e}$, into NAND-gate 264.

AND-gate 106, comprising part of exclusive NOR circuit 107, receives inputs from $\overline{Q}$ flip-flop 108 and U/D line. AND-gate 109 receives inputs from the Q output of flip-flop 108 and the $\overline{U/D}$ line.

Since the U/D line has been high prior to receipt of the last error signal, $\overline{Q}$ would be low and Q would be high. When the U/D line went low as a result of the change in the error signal, $e$, the output from exclusive NOR circuit 107 would be low and AND-gate 104 would be inhibited.

If the inputs to the gates had not changed signs the exclusive NOR circuit output would be high and AND-gate 104 would be enabled to pass the next RCT pulse from And gate 110 of the RCT pulse generating logic 111. Note that gate 110 also receives an input from NAND-gate 124 which itself inverts the TI$_x$ from AND-gate 137 (FIG. 8). This insures that RCT pulses will not erroneously occur at the same time that biquinary counter 134 is advanced.

The output from AND-gate 110 toggles flip-flop 108 so that its Q and $\overline{Q}$ outputs indicate the states of the U/D and $\overline{U/D}$ lines, respectively, at the time the last RCT pulse was generated.

The RCT logic comprises AND-gate 112 for toggling flip-flop 113. The output from flip-flop 113 controls the output from flip-flop 114. The $\overline{Q}$ output from flip-flop 114 provides one input to AND-gate 110. The other input is received from the Q output of flip-flop 113.

Gate 112 is high upon receipt of a clock signal, (CK), the 2 kc. or 200 kc. signals and the high output of $\overline{Q}$ from flip-flop 113. Flip-flop 113, $\overline{Q}$, is set high by the output from frequency control logic circuit 115.

If the error signal is below a certain amplitude, the relatively low frequency signal, 2 kc. provides the signal to flip-flop 113. However, if the amplitude exceeds a predetermined level, the relatively high frequency signal, 200 kc., is provided. The high frequency signal is also provided during the setup mode.

Another embodiment (not shown) may be used to provide counting signals having higher frequencies to increase the speed of system operation.

A signal is also received by flip-flop 114 from synchronizing logic circuit 116. The flip-flop 114 is toggled by the signal to terminate an RCT pulse when the synchronizing signal goes from high to low as a function of the counting direction of the internal counter 4 and the relationship of the input signals 1CT and 1CV from the reference and internal counters, 2 and 4, respectively.

The synchronizing circuit 116 comprises exclusive NOR circuit 117 which receives inputs, 1CT and 1CV, and provides a high output if both inputs agree. If both inputs disagree the output is low. The output is inverted by NAND-gate 120. Exclusive Or circuit 123 provides a high output to flip-flop 114 when its inputs ($\overline{U/D}$ and 120; U/D and 117) disagree and a low output when the inputs agree. The U/D and $\overline{U/D}$ inputs are generated by flip-flop 105.

Therefore, assuming no inhibit output from NOR circuit 107, RCT pulses are enabled to be generated at coincidences between 1CT and 1CV counts when the internal counter 4 is counting up and at anticoincidences between the counts when the internal counter 4 is counting down. Otherwise, it would be possible to detect successive coincidences when counting up, and to miss coincidences and to therefore generate erroneous data when counting down.

It is noted the −n, or nines complement, count has an opposite polarity, or parity, to that of the +n count. For example, if the internal counter 4 has a count of one, the nines complement would be 1998. As a result, when RCT pulses are generated for enabling the −n count to change, the +n count is also changed in the opposite direction. Both counts are changed in synchronism and gross counting errors are avoided.

For a specific example, assume that the internal counter 4 is set to count down from a count of 0001. The $\overline{U/D}$ line would be high. When the reference counter 2 contained a count of one, the output from NOR circuit 107 would be high and when the reference counter 2 contained a count of two, the output would be low. When the output went low, and assuming no inhibit output from NOR circuit 107, an RCT pulse would be terminated from AND-gate 104 to decrease the internal count by one.

If, however, the internal counter 4 had been set to count up from a count of two, the NOR output would be set high upon receipt of the next succeeding 1CT pulse from the reference counter 2 and the RCT pulse would be terminated from AND-gate 104 upon receipt of the next succeeding 1CT pulse.

If tens complement instead of nines complement had been used, odd parity between the +n and −n counts would not exist, and it would have been possible to detect successive coincidences for one channel and completely miss coincidences in the other channel depending on the direction in which the internal counter 4 is counting.

Frequency control circuit 115 comprises NAND-gate 125 which receives $SU_x$ and ES signals from the external logic 9 and rectification circuit 18, respectively.

Ordinarily, the $SU_x$ is low during the setup mode and is high at other times. The ES signal is normally high but is set low if the signal from filter 17 exceeds a predetermined level.

If either signal is low, the output of the gate 125 becomes high and NAND-gate 126 provides the higher frequency signal to flip-flop 113, through NAND-gate 127.

If both signals are high, the lower frequency signal is passed through NAND-gates 128 and 127 to flip-flop 113. NAND-gate 268 inverts the output from NAND-gate 125.

During part of the setup procedure, it is necessary to control the counting direction of internal counter 4 from external counter logic 9. Logic 129 provides output signal $U/D_n$ for controlling the internal counter 4 during that portion of the setup mode as well as during normal operations.

When the $SU_x$ signal is low during setup, the output from NAND-gate 130 is high. The output from NAND-gate 133 is also high. NAND-gate 132 is therefore set high if $U/D_x$ is high, forcing an upward count. If $U/D_x$ is low, NAND-gate 131 is set high and NAND-gate 132 is set low, for a down count.

During normal operations, $SU_x$ is high so that $U/D_n$ follows the setting of the U/D line from flip-flop 105, via gate 133.

NAND-gate 269 receives 1CT pulse and inverted output of RCT pulse generating logic 111 from NAND-gate 270 for generating a 2 mc. counting signal. The 2 mc. signal is used as described in connection with FIG. 8.

FIG. 8 shows one embodiment of external control logic 9 comprising biquinary counter 134 having series connected B, C, D and A decade counters. NAND-gate 135 receives a clear, CL, signal from reset switch 25 to set the counter to a count of nine indicating normal readout. The reset switch 25 is also depressed prior to initiating a setup mode as described below.

Counting pulses, 2 mc. from NAND-gate 269 of internal control logic 5 are passed through AND-gate 136 as a function of the count in biquinary counter 134. Input pulses to the counter are received by the B decade instead of by the A decade for implementing the biquinary counter 134.

Four signals having logical states as a function of the count comprise inputs to AND-gate 137 which has its output connected to AND-gate 136. When its inputs are all high it enables gate 136 to pass the 2 mc. signal. The 2 mc. signal, for the example given, is used to provide counting pulses to counter 134 for preventing interference between the biquinary counter 134 and other counters in the system. Its counting rate is thus substantially faster than the maximum rate at which the other counters are allowed to count.

NAND-gates 138, 139, 140 and 141 invert the state of the outputs from the counter decades, A through D, to provide proper inputs to the decoding logic (AND-gate 144, NAND-gates 142, 143, 145, 148 through 157) of the external control logic 9.

At the beginning of system operation reset switch 25 is depressed to set the counter 134 at a count of nine, or readout mode. Subsequently, when the mode switch 24 is placed in the setup mode, the counter 134 begins a sequential count for completing the setup mode.

NAND-gate 142 decodes the counts 0 and 5 of counter 134, to generate a clear signal, $CL_n$, to the internal counter 4. The gate 142 receives inputs from NAND-gates 138, 139 and 140, as well as a strobe input from gate 136 via diode 170. This strobe prevents spurious signals, and hence incorrect decoding, from occurring when counts 0 and 5 are decoded. The output of gate 142 also provides an input to AND-gate 144.

AND-gate 144 receives the decoded counts, 0, 2, 5, 7 and the CL signal from the pushbutton reset switch 25 for generating clear signal, $CL_x$, to the external counter 20. The gate 144 receives inputs from the CL line, NAND-gate 142, and NAND-gate 143. NAND-gate 143 receives inputs from NAND-gate 140, and directly from the C stage of the counter 134.

Signal $SU_x$ into the internal control logic 5 is taken directly from the D stage of counter 134. It is high at counts of 4 and 9. Otherwise, it is low, thereby indicating the setup mode.

The direction in which the internal counter 4 counts during certain periods of setup is controlled by signal, $UD_x$, from NAND-gate 145, which also provides a preset signal to flip-flop 146 and a clear signal to flip-flop 147 of the $U/D_x$ control logic. $U/D_x$ logic controls the direction in which the external counter 20 counts. NAND-gate 145 is coupled to the $CL_x$ output of gate 144 via diode 130 to insure that the counting direction of internal counter 4 will not be set erroneously during a "clear" operation.

At count 4, NAND-gate 151 is set low since the RO line is high. NAND-gates 153 and 154 are high so that NAND-gate 148 is low and NAND-gate 145 is high. As a result of gate 148 being low, flip-flop 147 is preset high and flip-flop 146 is cleared.

The state of the $U/D_n$ line during count 4 is passed to the output of the $U/D_x$ line so that the external counter 20 follows the internal counter 4. As will be described subsequently, during count 4, the counters, 4 and 20, are counting the offset number. For that reason, the external counter 20 must follow the internal counter 4.

NAND-gates 149, 150, 151 and 152 decode counts of 1 and 8, 6, 4 and 9, of counter 134, respectively. Each of the gates 148 through 152 receives appropriate input signals for enabling the decoding. For example, NAND-gate 149 receives a signal from NAND-gate 155 which has inputs from NAND-gates 156 and 157. These gates receive inputs directly from the A and C stages and from the inverted outputs of the C and A stages of counter 134, respectively.

Since the part start number has a + or − sign, the internal counter 4 will be commanded to count up for a + number and down for a − number during counts 1 and 8. During count 6, both counters, 4 and 20, count up.

Part start coincidence signal, PS, provides an additional input to NAND-gate 149 which also receives input signals from stage B of the counter 134 and gates 138 and 155. At the counts of 1 and 8, the state of PS is inverted by gate 149. When there is a coincidence the output is high and gate 137 becomes high. A new count can be entered into counter 134.

The offset coincidence signal, OS, provides an input to NAND-gate 150. Readout mode signal, RO, provides an input to NAND-gate 151 and setup mode signal, SU, provides an input to NAND-gate 152. When the counter 134 has reached the proper counts, these gates (150 through 152) are controlled by the state of the input signals.

The U/D$_x$ control logic 271 comprises JK flip-flops 146 and 147 having triggering inputs from the RCT line and from AND-gate 158, respectively. AND-gate 158 receives inputs from AND-gate 159 and RCT. AND-gate 159 is high when the external counter 20 is in a zero condition and the output from NAND-gate 151 is high.

NAND-gates 160 and 161 control the + and − indicators, respectively, for the display 21. The + and − output lines are shown as a single ± line in FIG. 1a. NAND-gate 161 inverts the output of NAND-gate 160. NAND-gate 162 receives an input from gate 159 and provides a low output for setting gate 160 high when a zero condition exists in the external counter 20. At other times, the +, − gates (160 and 161) are controlled by the state of $\overline{Q}$ output from flip-flop 147 as a function of the state of the U/D$_n$ line and the passing of the external counter 20 through zero, and therefore from one counting direction to another. The ZD line indicates when the counter 20 is at zero.

NAND-gate 163 inverts the signal on the U/D$_n$ line and provides an output at the K input to flip-flop 146, NAND-gate 164, and NAND-gate 165.

If the U/D$_n$ line from the internal control logic 5 is high for counting up, NAND-gate 166 sets NAND-gate 167 high. If the U/D$_n$ line is low for counting down, NAND-gate 165 sets gate 167 low. It is assumed that flip-flop 147 is in the logic one state so that its Q output is high and its $\overline{Q}$ output is low.

NAND-gates 164, 168 and 169 together with gates 158 and 159 properly control flip-flop 147 so that the state of the U/D$_x$ line will be changed with respect to the state of the U/D$_n$ line. The $\overline{Q}$ output from flip-flop 147 controls the sign of the display 21 as indicated above.

During normal readout operations in the count 9 state of biquinary counter 134 the U/D$_n$ state is passed through the logic to the U/D$_x$ line. This assuming a minus (−) input to gate 154 so that gate 148 previously set flip-flop 147 during count 8. When a zero is detected by gate 159 while counting down, the next RCT pulse causes the flip-flop 147 to toggle and reverse the relative direction of the external and internal counters 20 and 4, respectively.

For example, during a measuring operation the internal and external counters 4 and 20 respectively may be counting down. If the workpiece (not shown) has a zero position 302 (FIG. 17), it may be necessary to move the probe through the zero without reversing the direction of machine motion. The external counter 20 has a plus or minus indicator so that it can count through zero while the internal counter 4 is counting up or down. The logic 271 described in the previous paragraphs is provided for reversing the counting direction and sign of the external counter 20 when a zero condition is detected. Thus the displayed dimensions increase + and − on either side of zero.

A summary of the decoding operation during the setup mode is shown in table I below:

TABLE I

| Biquinary Counter ABCD | Decoded Count | |
|---|---|---|
| 0000 | 0 | CL and CL$_x$ (clear internal and external counter) |
| 0100 | 1 | PS counted into external and internal (up if + and down if −) counters |
| 0010 | 2 | CL$_x$ |
| 0110 | 3 | No action |
| 0001 | 4 | Servo (external counter slaved to internal counter in count and direction) |
| | | (Offset number computed and displayed, operator sets offset in thumbwheel and mode switch to readout) |
| 1000 | 5 | CL$_n$ and CL$_x$ |
| 1100 | 6 | OS counted into internal and external counters |
| 1010 | 7 | CL$_x$ |
| 1110 | 8 | PS algebraically added to OS in internal counter; PS counted into external counter |
| 1001 | 9 | Normal readout |

FIG. 9 is an embodiment of U/DΔ control logic 32 for controlling the counting direction of incremental, or delta counter 36 as a function of the M/L line, the U/D$_n$ line, and the zero state of the delta counter 36. The logic 32 controls the delta counter 36 so that it always has an increasing count away from zero.

It is pointed out that during data transfer from the input switches 29, or from the tape reader 28, the M/L signal is used to control counting direction.

The state of the U/DΔ line 43, shown in FIG. 2, is the same as the M/L line or the U/D$_n$ line depending upon the mode of operation, when the number in the delta counter 36 is positive and is in the opposite of the M/L and U/D$_n$ lines when the number in the delta counter 36 is negative. If, for a given state of the M/L line the delta counter 36 crosses the zero, the U/DΔ line 43 will change states even though the M/L line remains unchanged, for example, as a result of a residual count in the counter 36. Likewise, the U/DΔ line can change states even though the U/D$_n$ line has not changed when the delta counter 36 crosses zero, for example, as a result of an overshoot.

Flip-flops 37 and 38 are cleared (C) and preset (P), respectively by the CL$_n$ signal from external control logic 5 during the setup mode. Flip-flop 37 with exclusive Nor logic comprising gates 40, 41 and 42 detects changes in the U/D$_n$.

Flip-flops 37 may toggle upon receipt of the next pulse so that the Q and $\overline{Q}$ outputs represent the state and inverted state, respectively, of input line 39. The outputs, Q and $\overline{Q}$, are compared by NAND-gates 40 and 41 with the state and inverted state of the input line 39 following the setting of flip-flop 37. If no change occurs, the JK inputs to flip-flop 38 from NAND-gate 42 remain high. As a result of being preset, the Q output from flip-flop 38 is low. Flip-flop 38 is set during the slowdown and stop mode for indicating when the delta counter 36 passed through zero as a result of an overshoot by the machine.

Under those conditions, a high state on input line 39 is passed to output line 43 through NAND-gates 44 and 45. The other inputs to NAND-gate 45 are high so that the low output from NAND-gate 44 would controlling. If the input line 39 had been low however, the controlling input would have come from NAND-gate 46 which inverts the inverted state of the input line 39 received from NAND-gate 47.

The +, − outputs from NAND-gates 48 and 49 are controlled by the $\overline{Q}$ output of flip-flop 38 which is low for a high input line 39 before a zero detect (ZD) and by the output from NAND-gate 50 which is low at zero detect. When a zero is detected the output from AND-gate 50 toggles flip-flop 38 and its outputs, Q and $\overline{Q}$, are inverted. Also, NAND-gate 50 is low and U/DΔ is high. If the input line 39 changes, the U/DΔ line would again be inverted as described above although the sign of display 21 would not change until the next zero detect.

FIG. 10 illustrates one embodiment of comparator decade 210 of comparator 35 between decade 243 of external counter 20 and decade 212 of temporary storage device 34 which comprises four D-type flip-flops 272 through 275. An example of a counter usable as a decade of the external counter 20 is shown and described in connection with FIG. 4.

Each of the D-type flip-flops of decade 212 receives a strobe signal on line 192' in synchronism with strobe line 192. When the strobe signal is high, the Q outputs of the D flip-flops 272 through 275 set according to the state of the data on the D input lines 276. When the strobe signal is low, the data is stored and available for comparison with data in decade 243 of the external counter 20.

The "1" BCD input lines to the flip-flops of storage device 34 are connected to a common conductor, shown generally as line 276 from the data distributor 33 as are the 2, 4 and 8 lines. The data lines shown generally by line 193 from the input switch 29 to the data distributor 33 are similarly connected. The strobe signal, line 192, from the strobe switch (see FIG. 12) is switched from one position to another. As a result, the data on the 1, 2, 4 and 8 lines (line 276) is stored only by the flip-flops of storage device 34 receiving the strobe signal, line 192'. As the strobe switch 118 (FIG. 12) is switched from positions 1 through 6, data is transferred from the input switches 29 into the 1, 2, 4 and 8 flip-flops of each decade of storage device 34.

It should be noted that the strobe switch 118 includes a +, − position corresponding to the +, − sign storage stage 245. Since only two logic states are necessary to provide sign storage, a single flip-flop (not shown) may be used. The sign stage 245 would be the most significant stage of the temporary storage device 34. The sign to be compared with the +, − of the storage device 34 is received from external control logic 9.

Decade 210 of the comparator 35 compares input data from the associated stages of decade 212 of the storage device 34 and decade 243 of the external counter 20. For example, NAND-gate 213 receives the Q output (BCD-8) from the most significant flip-flop 272 of the storage 34 and the D output from the counter decade 243. The other input is received from either a prior stage as an equal signal, EQ, or as an enable signal which may be connected to a voltage source (not shown). NAND-gate 214 receives inputs from the $\overline{Q}$ output of the BCD-8 flip-flop 272 and the D output from the counter decade 243 in addition to an EQ signal.

The outputs from NAND-gates 213 and 214 provide inputs to AND-gate 215. The outputs from the NAND-gates 213 and 214 are a logic "1" when the inputs to the NAND-gates 213 and 214 are equal or a logic "0" when the inputs are not equal. The inputs are equal for example when $\overline{Q}$ is a logic "1" and $\overline{D}$ is a logic "1." If either had been a logic "0" and the other was a logic "1," the inputs would not have been equal.

Additional stages corresponding to BCD numbers 2, 4 and 8 are similarly implemented for providing, EQ output signals as a function of the inputs to NAND gates forming the stages and for providing a more or less signal (M/L) from M/L AND-gates 216 and 217 as a function of outputs from NAND-gates 214 and 218 and from NAND-gates 219 and 220 respectively, and the output from a preceding M/L AND gate. For the first stage of the comparator, the +, − storage, the M/L input line will be tied to a voltage source representing logic "1." The output from AND-gate 221 provides an equal indicating output if the data compared is equal.

The output from each of the AND-gates 216 and 217 is a logic "1" if the input data are equal, or where the data stored in the flip-flop (272 through 275) storage stages of the decade 212 are greater than the data stored in the stages of the counter decade 243. The outputs are logic "0" only when the stored number is less than the number in the external counter 20.

The output from the last M/L AND gate (not shown) of the comparator 35 provides a M/L output signal to U/D$\Delta$ control 32 and data distributor and mode control 33 during certain stages of system operation as described in connection with FIG. 11. The EQ output of the comparator 35 provides the input to a NOR-gate 207 for enabling delta RCT pulses when the line is a logic "0." The line is a logic "1" when the data being compared is equal, and the delta RCT pulses are inhibited.

As described in connection with FIG. 11, if the delta RCT pulses are not inhibited, the external counter 20 and the delta counter 36 are counted in appropriate direction as determined by the logic state of the M/L line, until equality is achieved and additional delta RCT pulses are inhibited. The $\Delta$RCT pulses are inhibited when all six decades of comparator 35 and the +, − comparator stage 246 indicate that the compared data are equal. In some cases, the external counter 20 may be required to pass from a number and sign of one polarity to a number and sign of the opposite polarity.

FIG. 12 shows switch 118 which is included as part of the data distributor 33 for sequentially connecting a strobe signal through lines 247 through 252 (FIG. 1b), to each of the dial input switches 29 and to each decade 245, 212, 278 through 282, of the temporary storage device 34. The strobe signal may have a frequency of, for example, 200 kc. which may be taken as an output from the second decade 231 of the reference counter 4.

When the switch 118 is in position 1, the first dial input switch 292 is actuated via line 283 and the signal is connected to the D flip-flops (not shown) of the first decade 245 of the temporary storage device 34. The strobe signal on line 283 actuates the dial switch 292 for generating an output logic signal representing the data set on the dial (shown generally). Since the first switch 292 provides only a plus or minus indication, the output would be either high or low depending on the setting of the switch 292.

At other positions of the strobe switch 118 the output signals from the input switches 29 represent the logic states of the 1, 2, 4 and 8 BCD data converted from the decimal data stored by the switches 29. Details on switches 29 for converting decimal data to BCD data are well known in the art.

As indicated in connection with FIG. 12, the manual switch 118 was selected as a matter of convenience only. Other devices such as relays, solid state switch devices, etc., could be used. When data is being read, for example, from the tape reader 28, logic would be required for decoding the address of the data and for generating signals to advance the tape (not shown) to the next position after data for a particular address had been read.

Figure 13:
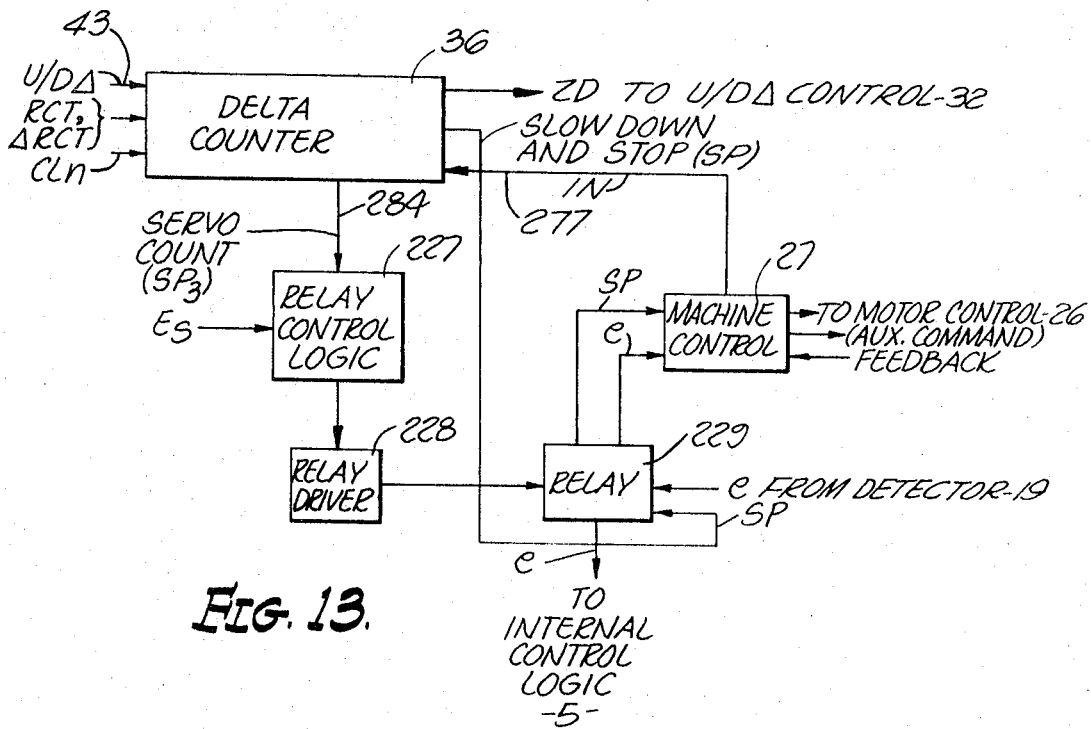
FIG. 13 is an illustration of a switch usable in the data distribution for controlling the mode of system operations.

FIG. 13 shows an embodiment of a circuit for switching into a servo mode when, for example, a count of less than 100 has been detected in the delta counter 36. Other counts could be selected as a function of machine characteristics. The less than 100 signal, designated as "servo count," provides one input to relay control logic 227. The other input is provided by the error signal, $E_s$, from rectifier 18. The relay control logic 227 may be implemented by logic gates (not shown) well known in the art.

The output from logic 227 provides an input to relay driver 228 which may be an amplifier for providing a proper voltage level to relay 229. Relay 229 may be double pole double throw relay which normally connects error signal, $e$, to the internal control logic 5 and the slowdown and stop signals, SP, to the machine control device 27. In a servo mode, when the relay 229 is actuated, the error signal, $e$, provides drive to motor 195 through machine control device 27.

In the event the motor 195 drives the movable machine member (numeral 12) past the command position, and if $E_s$ becomes greater by a predetermined value than the servo count signal, line 284, the relay 229 is deactuated. When the relay 229 is deactuated, the system is switched out of the closed loop servocontrol until a less than 100 (for the example assumed) count is again detected in the delta counter 36. The process is repeated until the movable member (numeral 12) is positioned at the command position. The movable member (numeral 12) can be driven to the command position from either side of that position.

Figure 14:
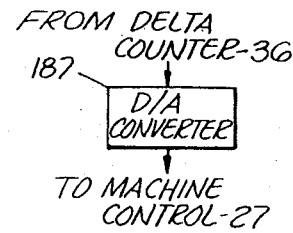
FIG. 14 shows a modification of the control system for producing a linear error signal from the incremental counter.

FIG. 14 shows a modification of the FIG. 1b point-to-point positioning system using digital-to-analog converter 187 as the means for developing a machine control signal delta counter 36 in lieu of the (SP) slowdown and stop signals. Digital-to-analog converter 187 may consist of a circuit connected between delta counter 36 and machine control device 27 which generates a linear AC or DC signal proportional to the number contained in delta counter 36. This analog signal then can be used to command servomotor 195, through suitable power amplification, so as to accomplish positioning of the movable machine member (numeral 12) in a manner similar to that described in connection with FIGS. 1b, 2 and 3. As the member moves toward the command position, the RCT pulses unload delta counter 36 thereby reducing the analog motor control signal from digital-to-analog converter 187, and causing movable member 12 to slowdown and stop at the command position.

The positioning system described herein uses the three independent counters, external counter 20, internal counter 4, and delta counter 36, interconnected in various combinations depending on the mode of operation. Six interconnection combinations are possible. The present system may use all of these combinations depending on the mode of operation. To the operator, the three basic modes internal to the system are the setup mode, the readout mode, and the positioning to command data mode.

Table II, below, outlines the six counter interconnection combinations; the table indicates the source of up/down control and the source of count or toggle pulses for the counters.

The purpose of switch 209 is to direct the up/down control signals and counter toggling pulses into appropriate channels depending on the selected mode of operation. The following is a brief description of the switching function as related to the particular mode of system operation.

When the switch 209 is in position 1, the external counter 20 is interconnected with the internal counter 4. The up/down control to the internal counter 4 is derived from the $U/D_x$ signal generated by the external control logic 9. The counter toggling pulses have a frequency of 200 kc. and are terminated by the part start (PS) or offset (OS) coincidence lines through NOR-gate 208.

TABLE II

| Position of Switch 209 | Counters mode | U/D control | Counter toggle pulses |
|---|---|---|---|
| 1 | External, internal: Set up mode. | $U/D_x$ from external control logic 9. | 200 KC terminated by OS or PS coincidence. |
| 2 | Internal, external: a. Set up mode, readout portion. | $U/D_n$ from internal control logic 5. | RCT from internal control logic 5 terminated by RCT inhibit (Inh). |
|  | b. Readout mode | do | Do. |
| 3 | External, delta: Data comparison loading of delta counter 36, positioning mode. | M/L from comparator 35. | ΔRCT (200 KC) terminated by equal (EQ) signal from comparator 35. |
| 4 | Delta, external: Display of actual position after positioning operation. | +, − from U/DΔ control 32. | 200 KC terminated by ZD from delta counter 36. |
| 5 | Internal, delta: Slow down and stop positioning mode. | $U/D_n$ from internal control logic 5. | RCT from internal control logic 5 terminated by RCT inhibit (Inh). |
| 6 | Delta internal: Final servo positioning mode. | +, − from U/DΔ control 32. | 200 KC terminated by ZD from delta counter 36. |

FIG. 11 illustrates a switching arrangement which satisfies the requirements for the counter interconnection combinations outlined in table II. Although FIG. 11 symbolically illustrates a six position switch 209 actuated by switch control logic 201, it should be noted that the functions of switch 209 can be implemented by other means, such as manually controlled switches, relays, stepping switches or solid state logic circuitry. Switch 209 and switch control logic 201 are included as part of a specific embodiment of data distributor and mode control 33.

In the embodiment illustrated in FIG. 11, the various sections of switch 209 are ganged together, as indicated by dashed line 200, and are connected, as indicated by dashed line 202, to switch control logic 201. Switch control logic 201 may comprise conventional logic for advancing switch 209 to the six positions shown (and listed in table II) in response to the conditions set forth in table III below.

Switch position 2 is used during normal readout as well as during the readout portion of the setup mode of operation (when the offset number is determined).

The external and internal counters, 20 and 4 respectively, are interconnected. The up/down control is derived from the $U/D_n$ signal from internal control logic 5 and counters 4 and 20 are toggled by RCT pulses. RCT pulses are terminated by an inhibit signal controlled by the error signal, $e$, reversal. AND-gate 204 controls passage of the RCT pulses in accordance with the state of the inhibit command.

With switch 209 in position 3, one of the internal functions is performed during the positioning mode of operation. The difference number is loaded into the delta counter 36 prior to a move. The external (20) and delta (36) counters are interconnected. Up/down control on signal line 285 is determined by the state of the more/less (M/L) line from comparator 35.

TABLE III

| Position of Switch 209 | Position of mode select Switch 51 | Other conditions |
|---|---|---|
| 1 | Setup mode | Reset switch 25 actuated; Movable machine member at part start position (PSP). |
|  | Setup mode | PSP entered in switches 22; Counter 134 at counts 0-3. |
|  | do | Offset (OS) entered in switches 23; counter 134 at counts 5-8. |
| 2 | Setup mode | Movable member at part start position (PSP). |
|  |  | PSP entered in switches 22; counter 134 at count 4. |
|  | do | Offset (OS) entered in switches 23; counter 134 at count 9. |
|  | Readout mode | Movable member anywhere; setup mode completed. |
| 3 | Positioning mode (slow down and stop or slow down then servo). | Setup mode completed; external counter 20 contains position of movable member; data selector switch 191 set to appropriate command data input device. Read switch 199 actuated. |
| 4 | Slow down and stop positioning mode. | External counter 20 contains command position; movable member stopped after positioning. RCT pulses inhibited. |
|  | Slow down then servo positioning mode. | Error signal $e$ at null. |
| 5 | Slow down and stop positioning mode. | EQ from comparator 35; RCT pulses not inhibited. |
|  | Slow down then servo positioning mode. | EQ from comparator 35; $SP_3$ from logic 119 is false. |
| 6 | Slow down then servo positioning mode. | EQ from comparator 35; $SP_3$ from logic 119 is true; Error signal $e$ not at null. |

External counter 20 and delta counter 36 are toggled by ΔRCT pulses from gate 207 in data distributor and mode control 33. These ΔRCT pulses are terminated by the EQ signal from comparator 35.

When the switch 209 is in position 4 after a slowdown and stop mode, the actual location of the movable machine member is displayed after it has been positioned. By interconnecting external counter 20 to delta counter 36 any residue existing in the delta counter 36 is transferred into the external counter 20. As a result, the visual display 21, which is always slaved to the external counter 20, includes this correction in the actual machine position which is displayed. The up/down counter signal on line 286 is derived from the +, − signal from U/DΔ control 32. 200 kc. count pulses are terminated by NOR-gate 206 upon occurrence of the zero detect (ZD) signal from delta counter 36. Thus, the operation ceases when the delta counter has been fully unloaded.

In switch 209 position 5, delta counter 36 is unloaded by RCT pulses as the movable machine member (numeral 12) is positioned. Up/down control is also derived from the U/D$_n$ signal from internal control logic 5. The RCT rate is dependent on the magnitude of the error signal, Es, from the measuring device 11. RCT pulses are terminated in response to the RCT inhibit signal by AND-gate 204.

When switch 209 is in position 6 (servo mode), delta counter 36 is fast counted zero when the servo count signal SP$_3$ is detected. The internal counter 4 changes its count accordingly. Up/down control on line 287 is derived from the +, − signal from U/DΔ control 32. 200 kc. toggle pulses are terminated by the zero detect (ZD) signal from delta counter 36 through NOR-gate 203.

Position error may be displayed with switch 209 in position 5. When movable member 12 comes to a halt, display 31 will indicate the difference between the actual machine position and the commanded position.

It should be understood that the nature of system operation as described herein is not limited to the use of similar counters. For example, this system employs BCD counter stages in the internal and external counters, 4 and 20 respectively, and binary counter stages ($2^0$ through $2^{19}$) in the delta counter 36. Depending on the specific application requirements, these counters (4, 20 and 36) may be implemented by other codes, binary, octal, decimal, etc.

Assuming, therefore, that the machine has been set up, a brief summary of the system operation will be described for the point-to-point positioning mode. Command data is read into the system and machine position data is read out by the display 21.

Although system operation could begin at any position on the workpiece, it is assumed for purposes of this description that the operation begins at a zero part starting dimension.

Normal operation can be either a slowdown and stop mode or a closed loop servo mode and data can be received from either the tape reader 28, computer (not shown) or the dial input switches 29. The first part of the description is applicable to both modes of system operation.

A command position, including the sign, is entered into temporary storage device 34, from, for example, dial input switches 29. Data select switch 191 would previously have been set to the dial switch position (not shown).

Although similar command positions are entered into storage devices for other axes, for purposes of this description, only one axis is described. The description is applicable to other axes of the multiaxis system.

Each of the strobe lines 247 through 252 into the dial input switches 29 is sequentially actuated by manually or automatically rotating switch 118 so that the data is entered into the appropriate storage devices beginning with the most significant digit (± data). After all the data has been entered, it is compared beginning with the most significant digit positions (±) and continuing to the least significant digit positions.

If the comparator 35 indicates an inequality between the external counter 20 and the temporary storage device 34, the distributor 33 directs ΔRCT pulses to the external counter 20 for changing the external count until equality is indicated.

While the external count is being changed, data distributor 33 provides ΔRCT pulses to the delta counter 36 so that the delta counter 36 counts the exact number of pulses necessary to achieve coincidence between the temporary storage devices 34 and the external counter 20. As a result, the delta counter 36 always will be loaded with a number representing the difference between the number in the external counter 20 and the new number appearing in the temporary storage devices 34.

The following example, using a six digit number, illustrates a change of data in the external counter 20 for achieving coincidence with data in the temporary storage devices 34. Assume that the external counter 20 contains the number +00.0000 and the new number in the temporary storage device 34 is +13.7500, external counter 20 and storage device 34 would contain the following numbers:

| | | External counter 20 | | | | | |
|---|---|---|---|---|---|---|---|
| Present Number (BCD) | 1 | 0000 | 0000 | 0000 | 0000 | 0000 | 0000 |
| | | | Temporary storage 34 | | | | |
| New Number (BCD) | 1 | 0001 | 0011 | 0111 | 0101 | 0000 | 0000 |
| Comparison sequence | A | BCDE | FGHI | JKLM | NOPQ | RSTU | VWXY |

Initially, the signs of the numbers are compared beginning at point A. Equality exists at points A, B, C, and D, so counting is inhibited until point E is compared. Since the new number is greater than the present number, the external counter 20 is directed to count up. Counting commences from the least significant stage of the six digit counter 20 and continues until the counter stage, represented as point E, matches the corresponding storage stage at the comparator 35. Subsequently, the next stage is compared.

Since equality exists in stages F and G, counting is not reenabled until point H is compared. At point H, ΔRCT pulses enter the external counter 20 until equality is indicated. The process continues until the number in the external counter 20 matches the stored number in the temporary storage devices 34 and further counting is inhibited.

During the transfer period, whenever external counter 20 was enabled to accept ΔRCT pulses, the delta counter 36 also was accepting ΔRCT pulses. As a result, when overall coincidence was achieved, the delta counter 36 would have received a number representing the difference between the external counter 20 stages and the temporary storage 34 before transfer. Since the example assumed that the counter 20 stages were initially set at zero, then the number in the delta counter 36 would be equal to the number in the temporary storage devices 34.

After the counting operation has been completed, the data distributor 33 actuates the machine control device 27 to generate a drive signal to the motor through the motor control device 26. The magnitude and sign of the signal are a function of the number and sign in the delta counter 36.

For a slowdown and stop operation, the machine control device 27 may be set to furnish any desired number of slowdown commands and finally a stop signal.

FIG. 3 illustrates the changes in motor velocity in response to the slowdown and stop signals. Prior to the first point, SP1, the motor 195 was driven at a maximum velocity of V1. During the period between SP1 and SP2, the motor 195 was driven at a velocity of V2 and during the interval between SP2 and SP3, the motor 195 was driven at a velocity of V3. When the stop point, SP3, is detected, the motor 195 may be deactuated and the movable machine member permitted to coast to the command position, CP. The last point, SP3, also may be used to switch the system into a servo mode as subsequently described in detail.

Slowdown of the machine may be achieved, for example, by reducing the drive signal, changing gear ratios or by other means well known to persons skilled in the art.

For the FIG. 3 example, the first switch point is selected to occur at a distance of approximately 2.5 inches from the command position. If it is assumed that the 2,000 pulses are equivalent to an operating cycle of 0.2 inch, 0.5 inch would be represented by setting stages $2^{14}$, $2^{13}$, $2^8$, $2^7$, $2^5$, and $2^3$ of delta counter 36 to logic one and by setting the remaining stages to logic zero. However, high accuracy in switch point selection is not critical, so that all logic settings less than the 14th stage ($2^{13}$) can be ignored. As a result, the number of bits would be reduced to 24,576 and the first slowdown point would be detected when that number had been counted.

The second slowdown point is selected to occur at a position of approximately 0.05 inch from the final position. The SP2 position is represented by 500 bits in the counter 36 and is equivalent to setting the 10th stage ($2^9$) to a logical one. The setting actually results in the number 512 (0.0512 inch).

Offset point SP3 is selected to be approximately 0.005 inch from the final position and is represented in the delta counter 36 by setting the seventh stage ($2^6$) to a logical one. The setting is equivalent to the number 64 (0.0064). If the number is too high for a particular machine's characteristics, the next lower binary digit ($2^5$) may be used. It should be obvious also that greater resolution may be achieved by combining stages of the counter 36.

For example, if the exact number 50 is desired, the circuit 288 shown in FIG. 16 may be used. AND-gate 78 will provide a pulse out when the number 50 is detected. Line P will indicate that all previous stages are at zero. Lines G, K and N will all be in the one state indicating the number 50 ($2^5$, $2^4$ and $2^1$). In order to insure that the remaining stages are a zero, lines L, M and O are fed into Nor gate 77, which produces a 1 only when all inputs are zero. This line is also fed into AND-gate 78. When all lines into AND-gate 78 are in the 1 state, its output will be a 1. However, as delta counter 36 is counted down towards zero, past the number 50, the output from AND-gate 78 will return to a zero state. If permanent storage of this detection point is desired, the AND-gate 78 output may be connected to a flip-flop (not shown) which will retain the state until reset by the zero detect line (ZD).

During positioning operations, the "IN" line 277 is set low (i.e. to the "0 activate" state) to enable the NOR gates of logic 119 (FIG. 2). A "1" output from the first Nor gate 289 appears only when the $2^{19}$ bit is in a "0" stage. The "1" output level from the NOR-gate 289 is inverted by a second NOR-gate 290 and appears as a "0" level input into the next Nor gate zero comparator 291. The first slowdown point, SP1, is inhibited until binary stages $2^{19}$, $2^{18}$, $2^{17}$, $2^{16}$, and $2^{15}$ are in the zero state.

However, in order to produce the first slowdown point, SP1, other logical states in addition to the state of the H line must be detected. For example, stages $2^{14}$ and $2^{13}$ must be set to a "1" state and stage $2^{12}$ must be set to a "0" state. Stages $2^{11}$ through $2^0$, inclusive, may be set to any state. Alternatively, either or both stages $2^{14}$ and 213 can be set in the "0" state with remaining binary stages in any state, or all binary stages can be set in a zero state.

The logic implemented by Nand gate 121 has inputs from the $2^{14}$, $2^{13}$ and $2^{12}$ lines (A, B and C). The presence of all "ones" will produce a zero output which will inhibit AND-gate 122. As a result, the SP1 output line will be inhibited or low. However, when the SP1 line is set high, it will remain high for all numbers less than the selected number.

Logic for generating slowdown point SP2 is implemented by NAND-gate 197 and AND-gate gate 198 and offset point, SP3, is implemented by NAND-gate 188 and AND-gate 189. The logic circuits (NAND-gates 197, 188 and AND-gates 198 and 189) used to inhibit or enable SP2 and SP3 are arranged in accordance with the binary number representing the desired slowdown and stop distances. Since SP2 is characterized by a "1" in the $2^9$ binary stage, only two "1" lines, D and E, are used to either inhibit or enable the I line. Stop point SP3 is represented by a "1" line in the $2^6$ binary stage and requires only two control "1" lines, F and G, with the J line.

In order to achieve the proper switching sequence, the SP2 signal is inhibited until SP1 has been set to a "1" state. The SP1 signal provides a high input to AND-gate 198 and SP2 provides a high input to AND-gate 189. The output lines, SP1, SP2 and SP3 are directed to machine control device 27 for adjusting motor speed.

The above description assumed that the command position was greater then the greatest switch point, SP1. If the command position had been less than a switch point, or a number of switch points, immediate detection of the points would have occurred. For example, if the command position had been 1.7500 inches, SP1 would be instantly activated. The machine would, therefore, be initially driven at a rate, V2, rather than the fastest rate of V1. Various switch points can be selected for changing the distances for the slowdown and stop commands. The logic gates (for SP1 through SP3) could easily be connected to the NOR gates of logic 119 at other stages.

In the above mode, the switch points were selected for permitting the to coast to the command position. In a pure servo mode initiated as soon as delta counter 36 has been loaded with the distance to go, the switch points are selected for modifying servocontrol so that positioning to an exact position is easier. For example, tachometer feedback level and passive stabilization networks may be adjusted upon detection of predetermined switch points for optimizing servo control. The system may be designed in one embodiment to eliminate all tachometer feedback when the machine position is in excess of a selected distance from null. During the period of zero tachometer feedback, the servo could be driven toward the selected position at maximum velocity. When the machine position is equal to a preselected switch point, e.g. SP3, the tachometer signal could be introduced into the control loop to provide the proper amount of damping as may be required for stable positioning at null.

As the motor 195 causes the movable member to be driven in response to the machine control 27 SP signals, and before entering the servo portion of a slow down then servo operation, internal counter 4 is forced to count in response to error signals, from amplifier 16, generated by the position-measuring device 11. The counter 4 attempts to maintain a count equal to the position of the movable member 12. Usually, it is slightly behind and, therefore, the sine/cosine signals generated by the function generator 10 represent the prior position of a machine member (numeral 12). As a result, an error signal from amplifier 16 is generated and the internal control logic 5 commands the internal counter 4 to count.

Each new count is compared with the count of the reference counter 2. If the error increases above a predetermined magnitude, Es, the system will count at an increased frequency rate.

In the slow down then servo mode, a closed loop servo mode is entered after the machine member, numeral 12, has been driven to a distance from the command position within one quarter cycle of the position-measuring device 11. The servo mode would be entered after the movable member 12 has been driven to a dimension within that cycle of the position-measuring device 11 which contains the commanded position.

When the servocount was detected the delta counter 36 would receive toggle pulses at a rate of 200 kc. to rapidly count the delta counter 36 to zero and correspondingly to set internal counter 4 to count representing the final command position.

Coincidence signals, $+n$ and $-n$ to the function generator 10 would change in response to the changes in the internal counter 4. However, the changes would be too fast to enable the movable machine member, numeral 12, to follow the corresponding sine/cosine commands from the function generator 10 which are changing as a result of a change in the internal counter 4.

The error signal, $e$, is transmitted from phase detector 19 through the relay 229 to the machine control device 27 for driving the servomotor 195. The motor 195 is driven through motor control device 26 until the position of the movable member 12 equals the position represented by the internal count. At that position, the error signal becomes zero and the machine is stopped. Overshoots in the servo mode have been previously described.

When the correct position has been reached, auxiliary commands may be given to the machine as read from the tape reader 28 or from appropriate input switches 29. Alternately, the auxiliary commands can be manually initiated.

Auxiliary commands may include driving the spindle down and up, clamping unclamping the table, and other commands well known to persons skilled in the art.

During the positioning and execution of auxiliary operation, an operator may load the new positioning data into the storage devices 34. As soon as the difference is loaded into the delta counter 36, new command data may be entered into the storage devices 34.

In a continuous operation mode, the operator loads a tape into the tape reader 28, sets the data selector switch 191 to continuous operation and presses the read switch 199. The system automatically transfers coordinate data and auxiliary commands from the tape into the storage device 34 and processes the information as described.

SYSTEM OPERATION

Figure 17:
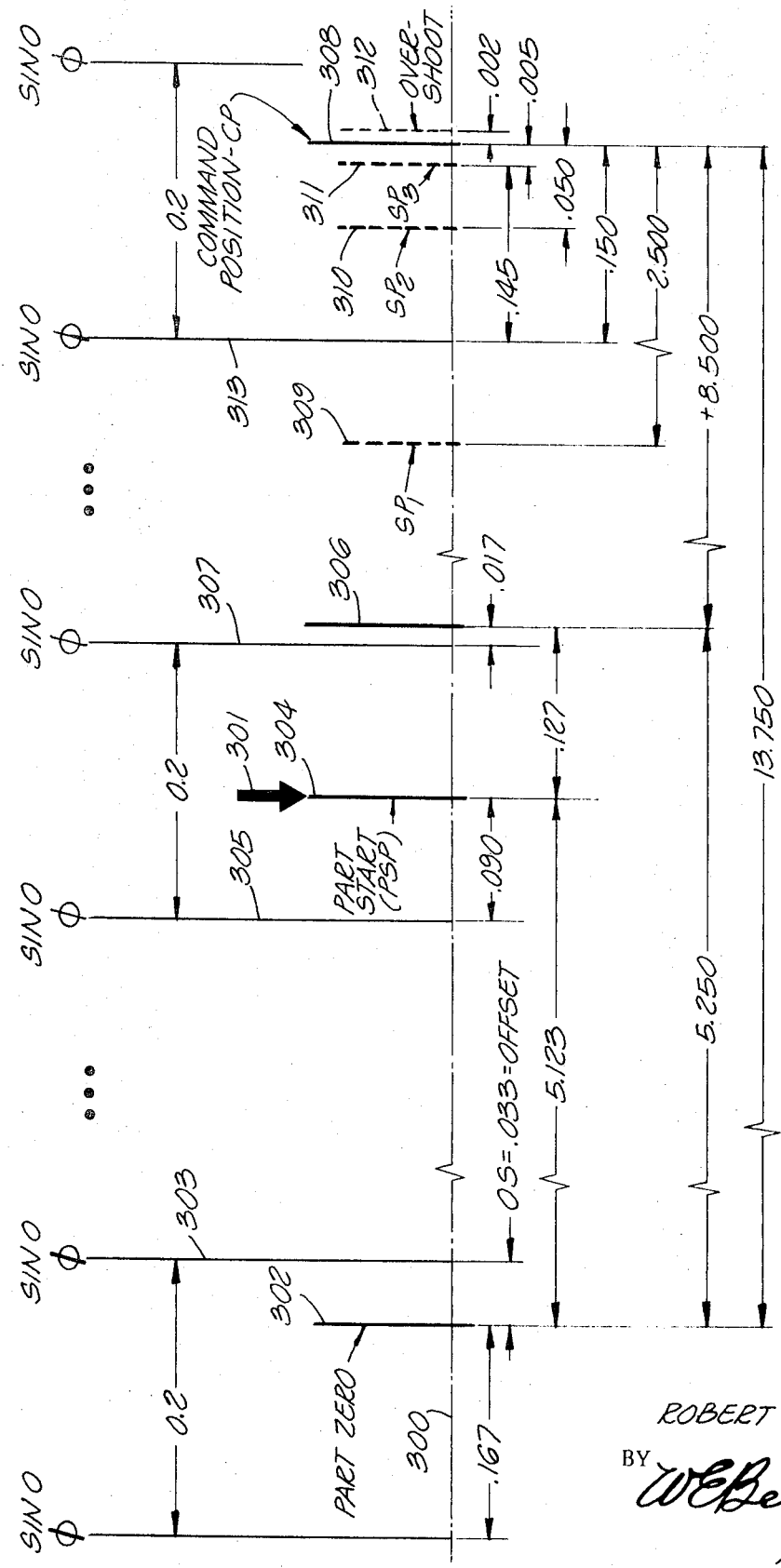
FIG. 17 diagrammatically illustrates typical setup, readout and positioning operations carried out by the inventive position control system.

Operation of the inventive position control system in the setup, readout and positioning modes best may be understood in conjunction with FIG. 17. Referring thereto, a horizontal line 300 symbolically represents a fixed machine member such as the stationary bed of a machine tool. An arrow 301 symbolically represents a movable machine member which may be positioned along fixed machine member 300 either manually or automatically under control of the inventive system. In FIG. 17 a single axis system is illustrated, with motion of member 301 to the right being considered in the positive (+) direction, motion to the left in the negative (−) direction.

The equally spaced vertical lines designated sin 0 in FIG. 17 represent the equally spaced reference positions of measuring device 11 (see FIG. 1a) employed with the system. In the illustrative example, these sin 0 positions are spaced 0.2 inches apart, and each RCT or ΔRCT pulse represents a distance of 0.0001 inch. A vertical line 302, designated part zero, indicates the position on a workpiece attached to machine tool bed 301 from which all measurements are to be referenced. Typically, part zero 302 does not coincide with one of the sin 0 positions, but is offset therefrom by an amount OS. The offset OS may be different each time a new workpiece is attached to machine tool bed 300. Thus, the setup mode is used initially to measure OS and to preset the system accordingly so that in subsequent operations all dimensions can be referenced directly to part zero 302. In FIG. 17, part zero 302 is offset in an adjacent sin zero 303 by an amount OS=−0.033 inches, the minus sign indicating displacement to the left.

To relate FIG. 17 to FIGS. 1a and 1b, note that movable element 12 of measuring device 11 is attached to machine member 301, while, the stationary member 13 of measuring device 11 is attached to machine tool bed 300. Machine member 301 may be positioned along bed 300 by operation of motor 195 and associated shaft 196.

In the SETUP mode, movable machine member 301 is placed at a part start position (PSP), indicated by vertical line 304 in FIG. 17, a known distance from part zero 302. In the example, part start position 304 is +5.123 inches to the right of part zero 302; this dimension (PSP) manually is entered into thumbwheel switches 22 (FIG. 1a). Mode select switch 51 is placed in the setup position, so that the SU input to external control logic 9 is grounded through arm 238 of mode switch portion 24. Setup operation then is in accordance with table I set forth hereinabove, the system automatically advancing through the various steps of counter 134 (FIG. 8). For steps 0-3 and 5-8 of counter 134, switch 209 (FIG. 11) in data distributor and mode control 33 (FIG. 1b) is in position 1; for steps 4 and 9 of counter 134, switch 209 is in position 2.

The following table IV indicates the contents of internal counter 4 and external counter 20 at each step of counter 134, the values corresponding to the example of FIG. 17. At the end of step 4, the offset thumbwheel switches 23 are set to 9,670, the OS then indicated on display 21; note that this corresponds to −0.033 inches.

TABLE IV

Setup Step No. (decoded state of biquinary counter 134)
Part start thumbwheels set to +05.1230 throughout
Offset thumbwheels set to 9670 at end of step 4
  State of Internal Counter 4
    ↓  State of External Counter 20 (always + for this example)
       ↓  Action

| | | | |
|---|---|---|---|
| 0 | 0000 | 000000 | Clear internal and external counters. |
| 1 | 1230 | 051230 | Count to part start. |
| 2 | 1230 | 000000 | Clear external counter. |
| 3 | 1230 | 000000 | No action. |
| 4 | 0900 | 999670 | Servo to null. |
| 5 | 0000 | 000000 | Clear internal and external counters. |
| 6 | 1670 | 009670 | Count to offset. |
| 7 | 1670 | 000000 | Clear external counter. |
| 8 | 0900 | 051230 | Count to part start. |
| 9 | 0900 | 051230 | Servo to null—will stay until machine moves. |

Setup operation terminates when counter 134 reaches a count of 9. At that time external counter 20 and display 21 contain the part start position 304 of movable machine member 301, as measured with respect to part zero 302. The contents of internal counter 4 (herein 0900) represents the location of part start position 304 within one cycle of position measuring device 11, that is, the distance of part start position 304 from an adjacent sin 0 designated 305 in FIG. 17.

The system now is set up for operation in either a readout mode in which the distance of movable machine member 301 from part zero 302 may be measured and displayed, or a positioning mode in which machine member 301 automatically is moved to a command position specified by data from an appropriate input device.

For READOUT operation, mode select switch 51 is placed in the readout position, so that the RO input to external control logic 9 is grounded through arm 238 of switch 24 (FIG. 1a). With mode select switch 51 so set, switch 209 (FIG. 11) in data distributor and mode control 33 will be situated at position 2, thereby slaving external counter 20 to internal counter 4. As machine member 301 is moved away from part start position 304 (FIG. 17), an error signal e is generated by position measuring device 11 in conjunction with amplifier 16, filter 17 and detector 19 (FIG. 1a). Since relay 229 is deenergized, this error signal e is directed to internal control logic 5 wherein the error signal gates RCT pulses to internal counter 4 and external counter 20. These RCT pulses increment or decrement both counters 4 and 20, depending on the direction in which member 301 is moved.

If machine member 301 is moved from part start position 304 to a new position 306 to the right thereof (as viewed in FIG. 17), the RCT pulses will increment internal counter 4 and external counter 20. Thus, when movable member 301 comes to rest at new position 306, the contents of internal counter 4 will represent the location of position 306 as measured with respect to an adjacent sin 0, herein designated 307. Specifically, counter 4 will contain the number 0170. The contents of external counter 20 will be 052500 and gates 160 and 161 (FIG. 8) will provide a + signal, together corresponding to +5.250 inches, the actual distance of position 306 from part zero 302; this distance will be indicated on display 21. Note that in this example machine member 301 was moved +0.1270 inches, thus 1270 RCT pulses will have been generated, each RCT pulse corresponding to a motion of 0.0001 inch. The RCT pulses incremented counters 4 and 20 since the motion was to the right.

Several system options are available for POSITIONING operation. Thus, to operate the inventive system in the slow down and stop-positioning mode, mode select switch 51 is turned to the corresponding setting, causing switch 209 (FIG. 11) in data distributor and mode control 33 to step to position 3. With machine member 301 initially at position 306, external counter 20 initially contains the dimension 5.250 inches representing the distance of position 306 from part zero 302. The +, − line from external control logic 9 is set to + to indicate that machine member 301 is to the right of + part zero 302. The contents of delta counter 36 is zero.

Data selector switch 191 (FIG. 16) is used to specify which data input device is to supply command position (CP) information to the system. (Herein CP is used to represent the desired location at which machine member 301 automatically is to be positioned.) By way of example, data selector switch 191 may specify that input data is to be obtained from tape reader 28. In this instance, the desired command position data is read from tape reader 28 into temporary storage 34. In the example of FIG. 17, the command position is represented by vertical line 308 situated 13.750 inches to the right of part zero 302 and 8.500 inches to the right of initial position 306.

The contents of temporary storage 34 (herein +137500), representing the desired command position 308, then is compared with the contents (herein 052500) of external counter 20 and the (herein +) sign of the +, − line from external control logic 9 by comparator 35 (FIG. 1b). Since the contents are unequal, the EQ line from comparator 35 is false. Since the contents of temporary storage 34 are greater than the contents of external counter 20, the M/L line is true. Under these conditions, ΔRCT pulses are gated to delta counter 36 and external counter 20 via gate 207 (FIG. 11) in data distributor and mode control 33.

The ΔRCT pulses change the contents of external counter 20 in a direction, determined by the state of the M/L line, which causes the contents of external counter 20 (see approach the value of the contents of temporary storage 34. Thus in the example, the ΔRCT pulses increment external counter 20. Simultaneously, the ΔRCT pulses increment delta counter 36. Moreover, the true state of the M/L line causes U/DΔ control 32 (see FIGS. 1b and 9) to produce a + output from gate 48. Note that gates 48 and 49 may be considered as storing the sign of the number in delta counter 36; this sign and the two least significant digits of counter 36 also are indicated on display 31.

Generation of ΔRCT pulses is inhibited as soon as comparator 35 produces an equal (EQ) output, that is, as soon as external counter 20 has been incremented sufficiently so that its contents represent the command position CP, and are equal to the contents of temporary storage 34. When this EQ condition occurs, the contents of delta counter 36 will represent how far machine member 301 must be moved to take it from initial position 306 to command position 308 (FIG. 17). Thus, delta counter 36 will contain the count 8,5000, and gates 48 and 49 will indicate a + sign together indicating the machine member 301 must be moved to the right (as viewed in FIG. 17) a distance of 8.500 inches.

Actual positioning of machine member 301 is initiated as soon as ΔRCT pulse generation has been inhibited by the occurrence of an EQ signal from comparator 35. When this signal EQ is sensed, switch 209 (FIG. 11) advances to position 5. A phase IN signal now is provided along line 277 to logic 119 associated with delta counter 36, as shown in FIG. 2. Since, in the example, the contents of delta counter 36 are 8.500, none of slowdown control lines $SP_1$, $SP_2$, and $SP_3$, will be true. Under these conditions motor control 26 will cause motor 195 (FIG. 1b) to drive shaft 196 at a velocity $V_1$, and in a direction determined by the + sign of gates 48 and 49 (FIG. 9). This direction is appropriate to drive machine member 301 toward command position 308.

As machine member 301 begins to move toward command position 308, RCT pulses are generated by internal control logic 5 in response to the error signal e as described above. Now, however, these RCT pulses are not provided to external counter 20, but are directed to internal counter 4 and to delta counter 36. The RCT pulses either increment or decrement internal counter 4, as determined by the sign of error signal e, so that internal counter 4 always represents the current position of movable machine member 301 within a cycle of measuring device 11. The RCT pulses also decrement delay counter 36 toward zero, so that at all times the contents of delta counter 36 represent "how far to go," i.e., the distance which machine member 301 must be moved to get to command position 308.

Referring still to FIG. 17, as a movable member 301 reaches a position, indicated by the vertical dashed line 309, a distance of 2.50 inches from command position 308, the output signal $SP_1$ occurs from logic 119 (FIG. 2) associated with delta counter 36. As indicated by the diagram of FIG. 3, occurrence of $SP_1$ causes motor control 26 to decrease the velocity of motor 195 to a new velocity $V_2$ less than that of initial velocity $V_1$. Of course, this is the beginning of the slowdown process as movable member 301 approaches command position 308.

Since machine member 301 is still moving, additional RCT pulses are generated continuously decrementing delta counter 36. When machine member 301 reaches a position 0.050 inches from command position 308, as represented by vertical dashed line 310 in FIG. 17, control signal $SP_2$ is generated by logic 119. This $SP_2$ signal in turn causes motor control 26 to reduce motor 195 to a still lower velocity $V_3$. Finally, as machine member 301 reaches a position 0.005 inches from command position 308, represented by vertical dashed line 311 in FIG. 17, the signal $SP_3$ occurs. In response to this $SP_3$ signal, motor control 26 deenergizes motor 195 and machine member 301 coasts to a stop.

Should machine member 301 stop other than the command position 308, for example at the overshoot position represented by vertical line 312 in FIG. 17, sufficient ΔRCT pulses will be generated so that when member 301 comes to rest, the contents of delta counter 36 will represent the overshoot position. In the example, overshoot position 312 is 0.0020 inches to the right of command position 308, so that the contents of delta counter 36 will be 00020 when machine member 301 comes to a stop. Since machine member 301 went past command position 308, delta counter 36 will have counted down to zero and subsequently will have incremented up to the final count. As delta counter 36 passes through zero the sign of the delta counter, i.e., the sign represented by the outputs of gates 48 and 49, will have changed from plus to minus, in response to occurrence of a ZD input to U/DΔ control 32 (see FIG. 9). This delta counter 36 minus sign indicates that machine member 301 must be moved to the left (as viewed in FIG. 17) to reach command position 308. Display 31 will indicate both the sign and magnitude of the overshoot.

The coasting characteristics of movable machine member 301 will differ from machine to machine. Since display 31 indicates the undershoot or overshoot occurring for each positioning operation, the average undershoot or overshoot for a particular machine readily can be determined. This information may be used to adjust appropriately the distance from the command position at which logic 119 (FIG. 2) generates the $SP_3$ signal. For example, if a particular machine produces an average overshoot of 0.002 inches when $SP_3$ is generated 0.005 inches from the command position (as illustrated in FIG. 17), the inputs to gates 188 and 189 (FIG. 2) may be changed so that $SP_3$ is generated when machine member 301 is 0.007 inches from the command position. On subsequent slow down and stop positioning operations, machine member 301 will, on the average, come to rest at the desired command position.

After positioning in the slow down and stop mode, the actual rest position of machine member 301 automatically is read out by the inventive system. To accomplish this readout, switch 209 (FIG. 11) is set to position 4 in response to occurrence of the ΔRCT inhibit at the end of the positioning operation. Delta counter 36, which now contains the overshoot, rapidly is counted down to zero by 200 kc. pulses supplied via gate 206 (FIG. 11); the same pulses simultaneously are used to increment or decrement external counter 20 in accordance with the sign of delta counter 36. Thus, in the example of FIG. 17, the minus sign from gate 49 (FIG. 9) represents an overshoot of command position 308, thus external counter 20 will be incremented by the 200 kc. pulses from gate 206. At the end of this countdown operation, the contents of delta counter 36 will be zero, and the contents of external counter 20 will represent the actual position of machine member 301, including the overshoot. In the illustrative example, external counter 20 will represent the dimension +13.752, the actual stop position of machine member 301 as designated by vertical line 312 in FIG. 17. Display 21 indicates the actual stop position.

Appropriate setting of mode select switch 51 also enables operation in the slow down then servo mode. In this positioning mode, the inventive system functions in a manner identical to that just described for slow down and stop mode operation, until machine member 301 reaches position 311 at which time the SP₃ signal is generated. Upon the occurrence of the SP₃ signal, several actions occur. First, switch 209 (FIG. 11) is advanced to position 6. Next, delta counter 36, which then contains how far to go from position 311 (FIG. 17) to command position 308, rapidly is counted down to zero by 200 kc. pulses supplied via gate 203 (FIG. 11). The same pulses are used to increment internal counter 4 so that the new contents of internal counter 4 will represent the command position 308 as measured with respect to an adjacent sin 0. In the illustrative example, internal counter 4 will represent the dimension +0.150 inches, the distance of command position 308 from an adjacent sin 0 represented by line 313 in FIG. 17. The 200 kc. pulses from gate 203 also change the contents of external counter 20 so as to represent command position 308 measured with respect to part zero 302.

Occurrence of the SP₃ signal also actuates relay 229 (FIGS. 1b and 13) via relay control logic 227. Relay 229 then disconnects the SP signals from motor control 26, and instead provides to motor control 26 the error signal $e$ derived from position measuring device 11; the error signal $e$ also is disconnected from internal control logic 5. Motor 195 continues, now under control of error signal $e$, to drive shaft 196 and movable member 301 towards command position 308. Since the error signal has been disconnected from internal control logic 5, no RCT pulses are generated as machine member 301 moves, and the contents of internal counter 4 continue to represent the command position.

When motor 195 drives movable machine member 301 ro command position 308, the error signal $e$ passes through zero. This null condition is sensed by appropriate circuitry in motor control 26, terminating the positioning operation. At this time machine member 301 is at command position 308, the contents of delta counter 36 are zero, internal counter 4 represents the location of command position 308 as measured within one cycle of position measuring device 11 and the contents of external counter 20 represent the location command position 308 as measured with respect to part zero 302. Display 21, slaved to external counter 20, provides a readout of the position 308 to which machine member 301 has been moved by the inventive system.

Subsequent to positioning of machine member 301, appropriate auxiliary commands may be carried out by the machine tool with which the inventive positioning system is employed. When the auxiliary commands have been completed, appropriate feedback is provided to machine control 27 (FIGS. 1b and 13); in turn, machine control 27 indicates to data distributor and mode control 33 that the positioning system is ready to accept the next positioning command.

At the start of the subsequent positioning operation, external counter 20 contains the actual present position of machine member 301, for example, overshoot position 312 (FIG. 17). The ΔRCT pulses alter the contents of external counter 20 from the initial value until they equal the new command position stored in temporary storage 34. Accordingly, the ΔRCT pulses will increment delta counter 36 so as to contain the actual distance machine member 301 must be moved from the previous stop position (which may differ from the previous CP) to the new command position. Thus, undershoot or overshoot errors are compensated for during each positioning operation, and positioning errors do not accumulate.

Note that in the slow down then servo mode, as the machine moves from one point to a second point, the Inductosyn command is continually shifted in space phase in synchronism with the Inductosyn position. During this operation, the position (i.e. the remaining distance to go) currently is stored in the Δ counter in steps of the division of the Inducotsyn fine cycle until a predetermined number of divisions remain; at this time these remaining divisions rapidly are transferred to the internal counter and simultaneously the motor is shifted from open loop to closed loop servocontrol.

While the invention has been described with respect to several physical embodiments constructed in accordance therewith, it will be apparent to those skilled in the art that various modifications and improvements may be made without departing from the scope and spirit of the invention.

I claim:

1. In a position control system having temporary storage means for storing a command position to which a machine member is to be moved, a first counter, the contents of said first counter indicating the present position of said member, and motor means for moving said member, the improvement comprising:
   a reversible counter,
   means for loading said reversible counter with a number equal to the algebraic difference between the contents of said temporary storage means and the contents of said first counter, said number representing the distance and direction said member must be moved to reach said command position,
   control means for controlling operation of said motor means in response to the contents of said reversible counter,
   said means for loading comprising a comparator for determining whether the contents of said first counter is more than, less than, or equal to the contents of said temporary storage means,
   means for decrementing or incrementing said first counter if the contents thereof are, respectively, more than or less than the contents of said temporary storage means, said decrementing or incrementing terminating when the contents of said first counter and said temporary storage means become equal,
   means for simultaneously incrementing said reversible counter by a like amount,
   means for changing the sign of said reversible counter to indicate whether said first counter is incremented or decremented.
   means for decrementing said reversible counter as said motor means moves said member toward said command position, and
   means for terminating said motion when said member reaches said command position, the residual contents of said reversible counter when said member stops representing any positioning error.

2. A position control system according to claim 1 further comprising means for decrementing said reversible counter to zero subsequent to said termination of motion and for accordingly changing the contents of said first counter to represent the actual position at which said member stopped.

3. In a position control system having temporary storage means for storing a command position to which a machine member is to be moved, a first counter, the initial contents of said first counter indicating the present position of said member and motor means for moving said member, the improvement comprising:
   a reversible counter,
   a comparator for determining whether the contents of said first counter is more than, less than, or equal to the contents of said temporary storage means,
   means responsive to said comparator for providing count pulses to both said first counter and said reversible counter when the contents of said first counter is unequal to the contents of said temporary storage means, said count pulses decrementing or incrementing said first counter if the contents of said first counter are, respectively, more than or less than the contents of said temporary storage means, said count pulses also incrementing said reversible counter from zero, said count pulses terminating when the contents of said first counter and said temporary storage means become equal, whereby the resultant contents of said reversible counter equal the difference between the contents of said temporary storage means and the initial contents of said first counter, said resultant contents representing the distance said member must be moved to reach said command position, control means for controlling operation of said motor means in response to the contents of said reversible counter, and means for causing said count pulses to decrement said reversible counter in response to error current derived from relative displacement of a first member associated with the movable 4. In a position control system having temporary storage means for storing a command position to which a machine member is to be moved, a first counter, the initial contents of said first counter indicating the present position of said member, and motor means for moving said member, the improvement comprising:

a reversible counter, a comparator for determining whether the contents of said first counter is more than, less than, or equal to the contents of said temporary storage means, means responsive to said comparator for providing count pulses to both said first counter and said reversible counter when the contents of said first counter is unequal to the contents of said temporary storage means, said count pulses decrementing or incrementing said first counter if the contents of said first counter are, respectively, more than or less than the contents of said temporary storage means, said count pulses also incrementing said reversible counter from zero, said count pulses terminating when the contents of said first counter and said temporary storage means become equal, whereby the resultant contents of said reversible counter equal the difference between the contents of said temporary storage means and the initial contents of said first counter, said resultant contents representing the distance said member must be moved to reach said command position.

control means for controlling operation of said motor means in response to the contents of said reversible counter.

means for storing a sign indicative of whether said first counter has been decremented or incremented, and wherein said control means causes said motor means to move in a direction determined by said sign, said motor movement causing said member to advance toward said command position, means for decrementing said reversible counter toward zero as said member moves toward said command position, said means for decrementing comprising means for generating counter toggle pulses in response to motion of said machine member, each of said counter toggle pulses representing movement by said member of an incremental distance, and means for causing said count pulses to decrement said reversible counter, said control means causing said motor to operate at a speed determined by the magnitude of the contents of said reversible counter, logic means cooperating with said reversible counter for producing speed control signals responsive to the magnitude of the contents of said reversible counter, said control means being responsive to said speed control signals, said motor control means causing said motor to run at progressively slower speeds at decreasing values of the magnitude of the contents of said reversible counter, occurrence of the final speed control signal causing deenergization of motor means, said final speed control signal being selected so that said member coasts to said command position subsequent to deenergization of said motor means, and means for causing said count pulses to decrement said reversible counter in response to error current derived from relative displacement of a first member associated with the movable machine member and movable relative to a second member of a position measuring transformer having cyclically spaced zero positions.

5. A position control system according to claim 4 wherein the residual contents of said reversible counter represent the magnitude of any positioning error when said member coasts to a halt.

6. A position control system according to claim 5 further comprising means for changing said stored sign if said member coasts beyond said command position, said changed sign indicating an overshoot.

7. A position control system according to claim 6 further comprising means for decrementing said reversible counter to zero and for simultaneously accordingly incrementing or decrementing said first counter, depending on said stored sign, whereby the contents of said first counter represent the actual position at which said member halted.

8. A position control apparatus including a system for measuring and controlling the position of a first member movable relative to a second member employing a position-measuring device having cyclically spaced zero positions, a motor for driving said first member, and means providing an error signal depending on relative displacement of said members, said system comprising:

an internal counter controlled by said position-measuring device, the contents of said counter indicating the relative position of said first member between two adjacent-spaced zero positions, means for storing a part-start position representing the distance of said first member from a reference not necessarily corresponding with one of said spaced zero positions, an external counter having a greater number of digits than said internal counter, a control logic for presetting said external counter to said part-start position during a setup mode and for slaving said preset external counter to said internal counter during a readout mode, whereby during said readout mode said external counter operates starting from said preset part-start position as said internal counter operates starting from said relative position, switching means for selecting either a readout mode or a positioning mode, said readout mode including means for slaving said external counter to said internal counter, said error signal being operative to supply digital pulses to said internal counter and to said external counter, each of said pulses corresponding to motion of an incremental distance, to increment or decrement both of said counters depending upon the direction of motion of said movable machine member, said movable machine member being movable to a new position where said pulses will increment both of said counters, whereby the contents of the internal counter represent the new position with respect to an adjacent sine zero and the contents of said external counter represent the actual distance of the new position from a reference zero, a delta counter controlling said motor, means for deriving other pulses from said digital pulses for loading said delta counter depending on a comparison of present and new positions of said first member, and means employing said digital pulses for unloading said delta counter.

9. Apparatus according to claim 8, said positioning mode including a slowdown and stop-positioning mode wherein said external counter initially contains a prior dimension with respect to a part zero and the contents of said delta counter being zero, means for supplying command data of a new position, a temporary storage for data of said new position, a comparator for comparing the contents of said temporary storage with the contents of said external counter, means responsive to the output of said comparator for supplying said other pulses to said delta counter and to said external counter thereby causing the contents of said external counter to approach the value of the contents of said temporary storage and simultaneously increment said delta counter, means for inhibiting generation of said other pulses when said comparator indicates that the contents of said temporary storage and said external counter are equal at which time the contents of said external counter represent the new command position and the contents of said delta counter represent how far said machine member must be moved to reach the new command position, and means for initiating actual positioning of said first member upon said inhibition of the generation of said other pulses.

10. Apparatus according to claim 9, said slow down and stop-positioning mode operation continuing until said movable member reaches a position in the proximity of the new position whereupon pulses are provided for (a) counting said delta counter to zero; (b) incrementing said internal counter to have new contents representing the command position within one of said cycles as measured with respect to an adjacent sine zero; (c) changing the contents of said external counter to represent the command position with respect to a reference zero; and means for putting said motor under control of the error signal derived from said position-measuring device.

11. Apparatus according to claim 9, comprising means for storing the sign of the number in said delta counter, and means for displaying said last-mentioned sign and certain least significant digits of said delta counter.

12. Apparatus according to claim 8 wherein after positioning in a slow down and stop mode said external counter contains a count representing the actual position said first member reaches in coming to rest at the desired command position including undershoot or overshoot.

13. Apparatus according to claim 12 including means for displaying the amount and sign of said undershoot or overshoot.

14. Machine tool control apparatus comprising means for comparing the count in temporary storage with the count in a first counter, means operative when said comparison indicated inequality to (a) load a second reversible counter with certain pulses and (b) direct said certain pulses to correspondingly change the contents of said first counter, means for deriving said certain pulses from other pulses derived from the error current of a position measuring device having a movable element fixed to a movable machine member driven by a variable speed motor, a control device responsive to the count in said second reversible counter to control the operation of said motor, means for decrementing both of said counters in response to said other pulses, and means changing the frequency of said other pulses in response to the magnitude of said error current.

UNITED STATES PATENT OFFICE
CERTIFICATE OF CORRECTION

Patent No. 3,612,976                     Dated October 12, 1971

Inventor(s) ROBERT W. TRIPP

It is certified that error appears in the above-identified patent and that said Letters Patent are hereby corrected as shown below:

Column 35, line 7, at the end of Claim 3, add: -- machine member and movable relative to a second member of a position measuring transformer having cyclically spaced zero positions. --
Claim 1, column 34, line 36, change the period to a comma.
Claim 4, column 35, line 34, change the period to a comma.
Claim 4, column 35, line 37, change the period to a comma.

Signed and sealed this 17th day of September 1974.

(SEAL)
Attest:

McCOY M. GIBSON JR.                      C. MARSHALL DANN
Attesting Officer                        Commissioner of Patents